US010353599B2

(12) United States Patent
Manabe

(10) Patent No.: US 10,353,599 B2
(45) Date of Patent: Jul. 16, 2019

(54) STORAGE SYSTEM THAT HAS A PLURALITY OF MANAGERS AMONG WHICH A MASTER MANAGER IS SWITCHABLE

(71) Applicant: Toshiba Memory Corporation, Tokyo (JP)

(72) Inventor: Shinichiro Manabe, Kanagawa (JP)

(73) Assignee: TOSHIBA MEMORY CORPORATION, Tokyo (JP)

(*) Notice: Subject to any disclaimer, the term of this patent is extended or adjusted under 35 U.S.C. 154(b) by 75 days.

(21) Appl. No.: 15/060,544

(22) Filed: Mar. 3, 2016

(65) Prior Publication Data

US 2017/0038984 A1    Feb. 9, 2017

Related U.S. Application Data

(60) Provisional application No. 62/200,713, filed on Aug. 4, 2015.

(51) Int. Cl.
*G06F 12/00* (2006.01)
*G06F 3/06* (2006.01)
*G06F 13/40* (2006.01)
*G06F 11/20* (2006.01)

(52) U.S. Cl.
CPC .......... *G06F 3/0619* (2013.01); *G06F 3/0635* (2013.01); *G06F 3/0689* (2013.01); *G06F 13/4022* (2013.01); *G06F 11/2028* (2013.01); *G06F 11/2038* (2013.01); *G06F 11/2048* (2013.01)

(58) Field of Classification Search
CPC .... G06F 3/0619; G06F 3/0689; G06F 3/0635; G06F 11/2028; G06F 11/2038; G06F 11/2048; G06F 13/4022
See application file for complete search history.

(56) References Cited

U.S. PATENT DOCUMENTS

| | | | | |
|---|---|---|---|---|
| 5,822,251 A | * | 10/1998 | Bruce | G06F 11/1068 365/185.33 |
| 6,801,992 B2 | | 10/2004 | Gajjar et al. | |
| 6,996,741 B1 | * | 2/2006 | Pittelkow | G06F 11/2092 714/11 |
| 7,155,638 B1 | | 12/2006 | Heideman et al. | |
| 7,721,155 B2 | | 5/2010 | Holdaway et al. | |
| 8,554,997 B1 | * | 10/2013 | Bonwick | G06F 3/0689 711/114 |

(Continued)

FOREIGN PATENT DOCUMENTS

JP    2014229253 A    12/2014

*Primary Examiner* — Kalpit Parikh
(74) *Attorney, Agent, or Firm* — Kim & Stewart LLP

(57) ABSTRACT

A storage system includes a first storage unit including a first processor and a first array of node modules, each including a memory unit, and a second storage unit including a second processor and a second array of node modules, each including a memory unit. The first processor is configured to control the first and second storage units, and the second processor is configured to control the second storage unit and not the first storage unit when the first processor is set to control the first and second storage units, and control the first and second storage units, when the first processor is set to not control the second storage unit.

12 Claims, 16 Drawing Sheets

(56) References Cited

U.S. PATENT DOCUMENTS

| | | | |
|---|---|---|---|
| 2010/0082857 A1* | 4/2010 | Klein | G06F 13/1684 710/51 |
| 2012/0284589 A1* | 11/2012 | Kim | G06F 11/1012 714/785 |
| 2014/0143401 A1 | 5/2014 | Carlen et al. | |

* cited by examiner

FIG. 14

| COMMUNICATION TIME | TRANSMISSION SOURCE | ADDRESSEE |

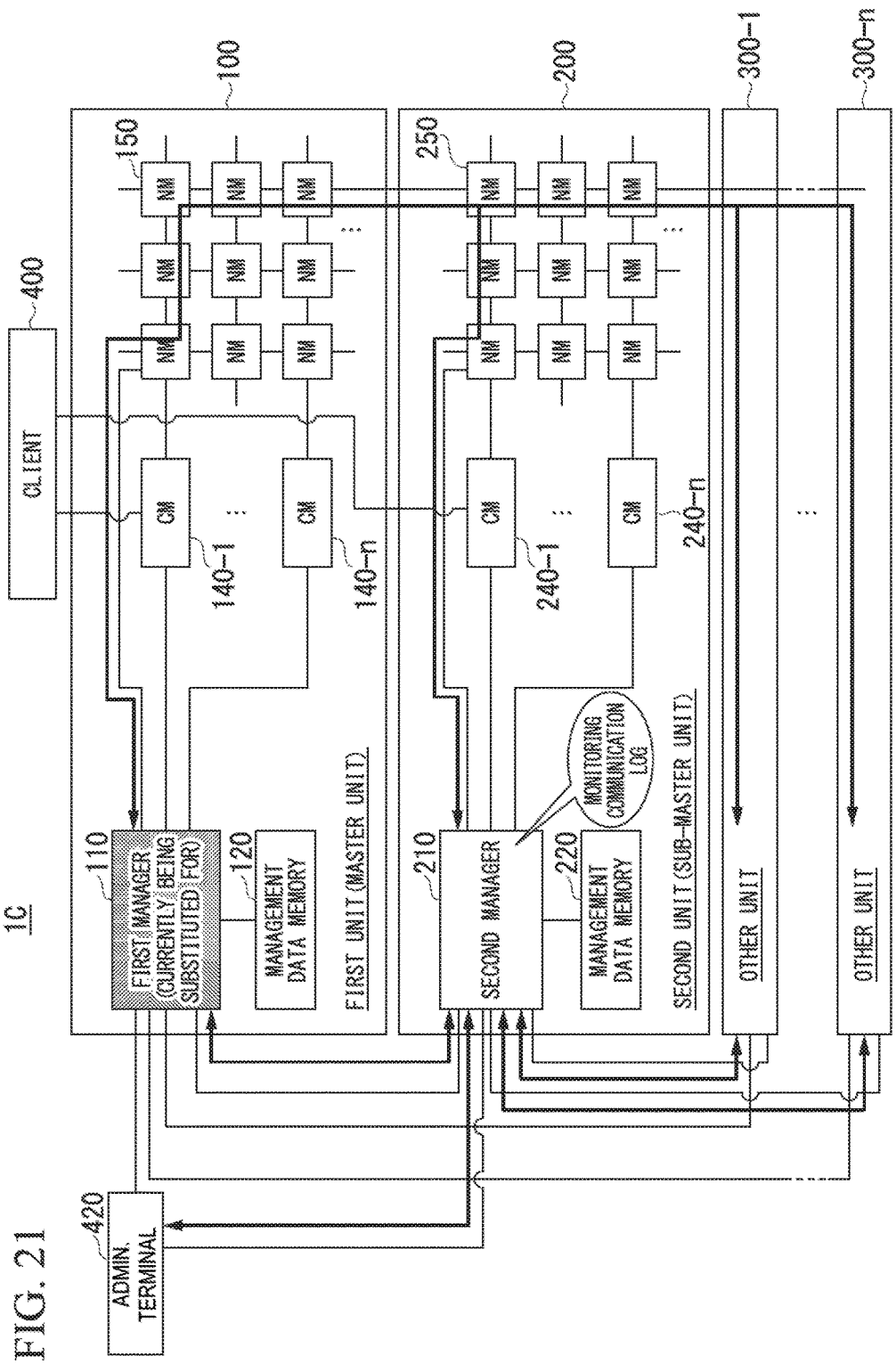

STORAGE SYSTEM THAT HAS A PLURALITY OF MANAGERS AMONG WHICH A MASTER MANAGER IS SWITCHABLE

CROSS-REFERENCE TO RELATED APPLICATIONS

This application is based upon and claims the benefit of priority from U.S. Provisional Patent Application No. 62/200,713, filed on Aug. 4, 2015, the entire contents of which are incorporated herein by reference.

FIELD

Embodiments described herein relate generally to a storage system, in particular, a storage system that has a plurality of managers among which a master manager is switchable.

BACKGROUND

In a storage system having a storage memory such as a flash memory, a master manager is provided to perform management thereof. However, if an abnormality occurs in the master manager, continued management of the storage system may be compromised.

BRIEF DESCRIPTION OF THE DRAWINGS

FIG. 14 shows a structure of data accumulated as a monitoring communication log.

FIG. 21 shows paths used for the monitoring communication when the second manager is the master manager and executes the overall management, in the storage system shown in FIG. 20.

DETAILED DESCRIPTION

According to an embodiment, a storage system includes a first storage unit including a first processor and a first array of node modules, each including a memory unit, and a second storage unit including a second processor and a second array of node modules, each including a memory unit. The first processor is configured to control the first and second storage units, and the second processor is configured to control the second storage unit and not the first storage unit when the first processor is set to control the first and second storage units, and control the first and second storage units, when the first processor is set to not control the second storage unit.

A storage system of one or more embodiments will be described below, with reference to the drawings.

[Overall Configuration]

Figure 1:
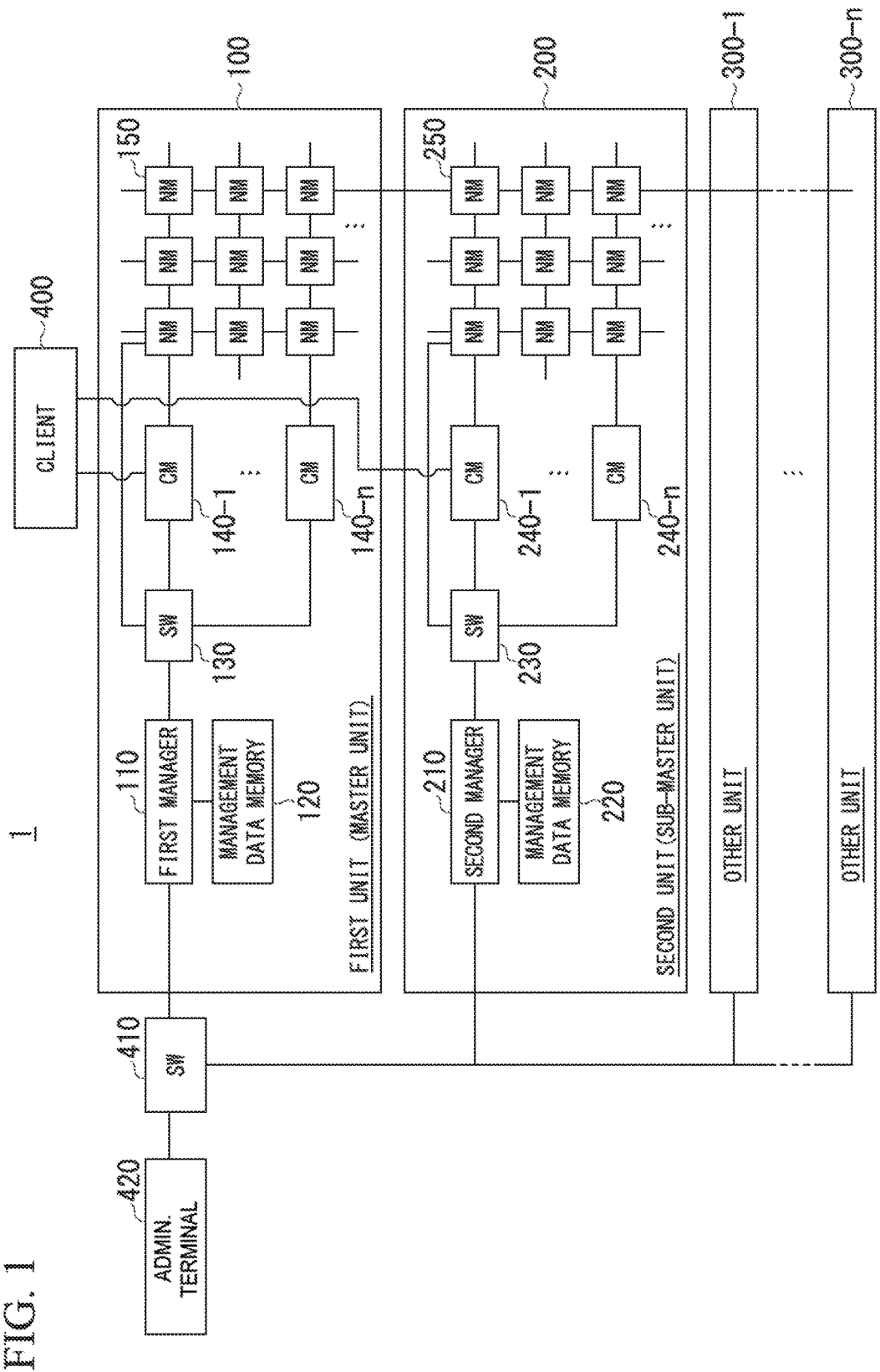
FIG. 1 shows an example of a storage system according to one or more embodiments.

FIG. 1 shows a storage system 1 according to one or more embodiments. The storage system 1 will first be generally described, referring to FIG. 1.

The storage system 1 may include, but is not limited to, a first unit 100, a second unit 200, and other units 300-1 to 300-*n* (where n is an arbitrary natural number). In the following, when no distinction is made among "other units 300-1 to 300-*n*" the other unit or other units will be referred to simply as "other unit 300" or "other units 300". The storage system 1 may omit the other units 300 and include only the first unit 100 and the second unit 200. In the embodiments, the "unit" need not be configured as a physically separate unit. The "unit" may be a virtual unit, indicating a grouping made electrically or in terms of control.

The first unit 100 may include, but is not limited to, a first manager (processor) 110, a management data memory 120, a switch (SW) 130, connection modules (CMs) 140-1 to 140-*n*, and one or more node modules (NMs) 150, each of which includes storage memory. In the following, regarding the first unit 100, if no distinction is made regarding a specific connection module, these will be referred to simply by the expressions "each connection module 140" or "connection module 140".

The first manager 110, executes first processing for managing at least the node modules 150 (managing the first unit 100), and that executes second processing for managing the entire storage system 1. In the following, the processing, which may in some cases be referred to as first processing or third processing (executed by a second manager (processor) 210 of a second unit 200), to manage a unit that it is in charge of will be referred to as "unit management," and processing to manage the entire storage system 1 will be referred to as "overall management." When the first manager 110 executes the overall management, the first manager 110 serves as a master manager.

The unit management may include, but is not limited to, recording (monitoring) and resetting of the status of connection modules within the unit, and power supply management. The unit management performed by the first manager 110 may be the same as the unit management performed by the second manager 210, or may have parts that are different therefrom.

The overall management may include, but is not limited to, at least one of power supply management (monitoring), failure management (monitoring), temperature control, address management that includes management of connection modules' IP addresses, and backup management (control) of the overall storage system 1. The backup management (control) may include, but is not limited to, transfer of data to another device, in accordance with an instruction from an external device. The external device is a device that is not included in the storage system 1. Alternatively, the master manager may perform the backup management (control) on its own determination, based on an internal criterion, without regard to an instruction from an external device. In such a case, the master manager may execute backup management on its own determination based on a criterion, such as each prescribed amount of time, when a prescribed amount of time has passed after a launching time, when a prescribed volume of data is updated, or when a prescribed number of errors occurred.

When the backup management is executed, a packet (to be described below) that includes the instruction content is transmitted from the master manager that performs the overall management to a connection module or a node module. The overall management may include transmitting (reporting) a status (for example, information regarding failures or storage memory requiring replacement) of the storage system 1 to an administrator terminal 420.

The storage memory is capable of overwriting data and maintaining data even if the power to the storage system 1 is switched off. The storage memory may be one into which data is stored in accordance with instructions from a client 400.

When the first memory 152 of a node module (described below), which is the storage memory, is a NAND-type flash memory, processing such as wear leveling and garbage collection may be included in the unit management or the overall management. The processing of wear-leveling, garbage collection, or the like may be executed by each of the connection modules 140.

Wear leveling is processing performed so that the number of overwrites is uniformly distributed among memory elements. Garbage collection is processing to move data other than unwanted data to other physical blocks, so that areas in a physical block into which unwanted (invalid) data had been written can be rewritten. That is, data in the original physical block is removed. Unwanted data is data that is not associated with a logical address. Management of RAID (redundant arrays of inexpensive disks or redundant arrays of independent disks) may be included in the unit management or the overall management, and may be executed by the connection module 140.

In the following, a manager performing the overall management will be referred to as the "master manager," a unit that includes the master manager will be referred to as a "master unit," a manager that is not originally supposed to perform the overall management but that has a possibility of serving as the master manager will be referred to as a "sub-master manager," and a unit that includes the sub-master manager will be referred to as a "sub-master unit." In the present embodiment, in an initial state, the first manager 110 is set as the master manager, the first unit is set as the master unit, the second manager 210 is set as the sub-master manager, and the second unit is set as the sub-master unit.

The first manager 110 may function by a processor such as a CPU (central processing unit) executing a program. The program may be stored in the management data memory 120. The first manager 110 may be hardware such as an LSI (large-scale integration) device or an ASIC (application-specific integrated circuit) or the like that has the same function as a processor executing a program.

The management data memory 120 may be implemented by an SD card that can be inserted into and removed from the storage system 1. An operating system (OS) and other programs executed by the first manager 110 may be stored in, but not limited to, the management data memory 120. The first manager 110 deploys (loads) a program from the management data memory 120 into a RAM (random-access memory) (not illustrated) and executes the program. Adopting this type of configuration facilitates updating of software executed by the first manager 110 and various settings by a manager. The various settings include settings one of the first manager 110 and the second manager 210 as the master manager.

Figures 2, 3:
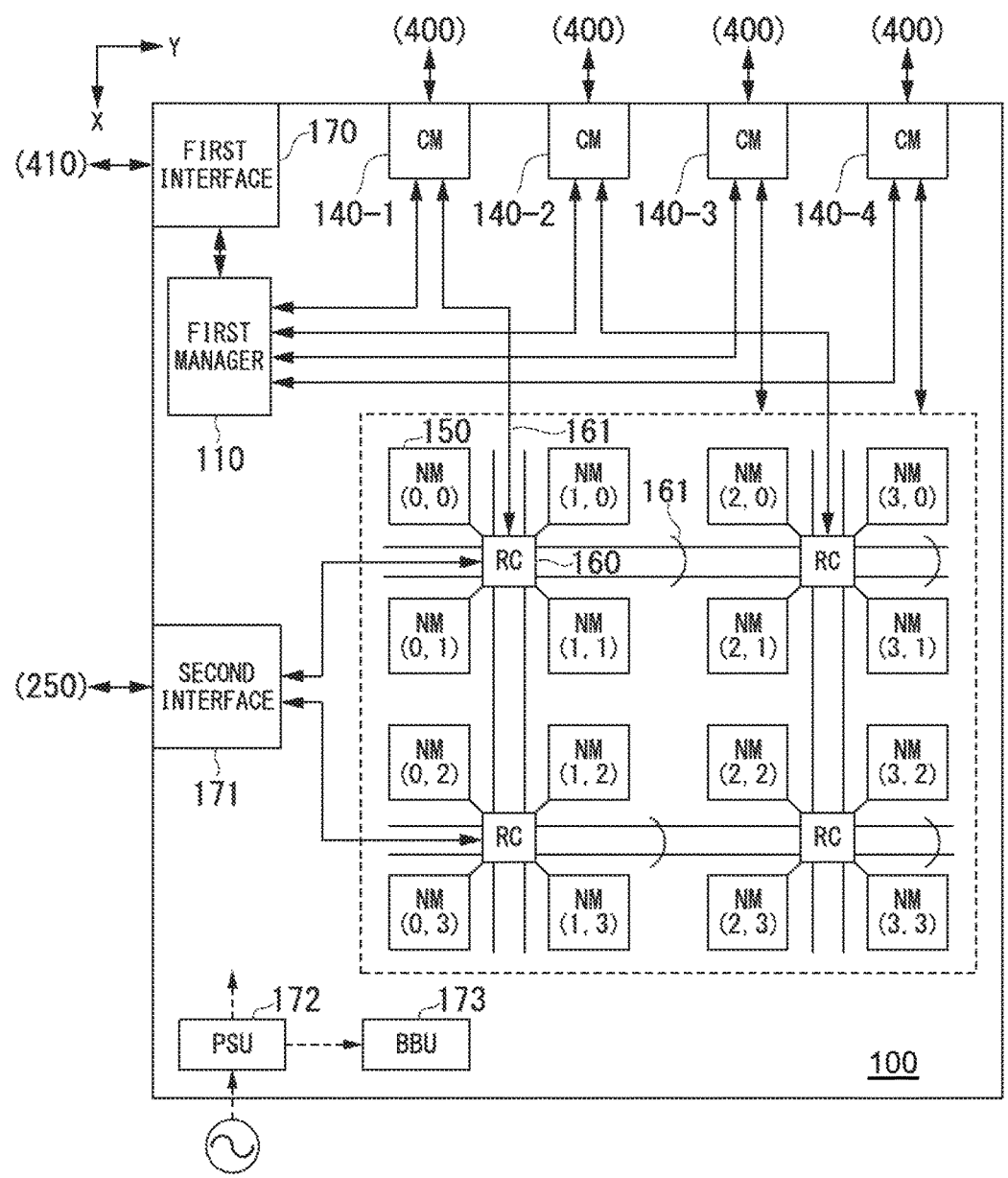
FIG. 2 shows a structure of data stored as management data in the embodiments.
FIG. 3 shows a configuration of a first (and second) unit in the storage system according to the embodiments.

The management data memory 120 stores therein management data. FIG. 2 shows a structure of data stored as the management data. The management data includes a master flag MF indicating whether or not the corresponding manager is set as the master manager, a priority PR used when there is master flag MF conflict between the first manager 110 and the second manager 210, and data of the other units 300 required for the overall management. In the following, a master flag MF value of 1 indicates that the corresponding manager is set as the master manager, and a master flag MF value of 0 indicates that the corresponding manager is not set as the master manager.

The first manager 110 is connected to the administrator terminal 420 via a switch (SW) 410. The administrator terminal 420 is a terminal device used by an administrator administrating the storage system 1. The administrator terminal 420 provides an interface such as a GUI (graphical user interface) to the administrator and transmits instructions with respect to the storage system 1 to the first manager 110 that has been set as the master manager. The first manager 110 that has been set as the master manager receives instructions and uses them for the overall management. The switch 410 is connected to, in addition to the first manager 110, the second manager 210 and managers of the other units 300, and relays communication between the managers. Launching of various units by the first manager 110 and the like is performed based on communication via the switch 410.

The switch 130 connects between the first manager 110 and the connection modules 140 and between the first manager 110 and the node modules 150.

The connection module 140 has a connector enabling connection to at least one client 400. The client 400 is used by a user of the storage system 1. The client 400 sends to a connection module (140, 240, or the connection module of another unit 300) a write request, a read request, or a deletion request with respect to the storage system 1. A connection module that has received the request uses a communication network between node modules (described below) to transfer the received request to the node module 150 having the address corresponding to the address specifying information included in the request. The connection module also receives from the node module 150 the data requested by a read request and transmits the data to the client 400.

The node module 150 includes a storage memory and stores the data requested by the client 400. The configuration of the node module 150 will be described below. The node module 150 has therein an area for backup of data stored in the management data memory 120.

The second unit 200 includes, but is not limited to, a second manager 210, a management data memory 220, a switch (SW) 230, connection modules (CM) 240-1 to 240-n, and one or more node modules (NMs) 250. In the following, regarding the second unit 200, if no distinction is made among the connection modules 240-1 to 240-n, these will be referred to simply as a connection module 240 or connection modules 240.

The second manager 210 executes third processing for managing at least the node modules 250 (managing the second unit 200), and, if necessary, executes the overall management in place of the first manager 110. This will be described below.

The second manager 210 may function by a processor such as a CPU executing a program. The program may be stored in, but not limited to, the management data memory 220. The second manager 210 may be hardware such as an LSI device or an ASIC or the like that has the same function as a processor executing a program.

The management data memory 220 is implemented, for example, by an SD card that can be inserted into and removed from the storage system 1. An operating system and other programs executed by the second manager 210 are stored in the management data memory 220. The second manager 210 deploys (loads) a program from the management data memory 220 into a RAM (not shown) and executes the program. Adopting this type of configuration facilitates updating of software executed by the second manager 210. The management data memory 220 stores management data in the same manner as the management data memory 120. The second manager 210 is connected to the administrator terminal 420 via the switch 410.

The switch 230 connects between the second manager 210 and the connection modules 240 and between the second manager 210 and the node modules 250.

The connection module 240 has a connector enabling a connection to at least one client 400.

The node module 250 includes a storage memory and stores data in accordance with instructions from the client 400. The node module 250 has therein an area for backing up data that was stored in the management data memory 220.

The other units 300, similar to the first unit 100 or the second unit 200, include a manager, a management data memory, a switch, a connection module, and a node module or the like, detailed descriptions of which will be omitted.

[Matrix Arrangement]

The hardware configuration and the like of the storage system 1 will be described below. FIG. 3 shows a configuration of the first unit 100. The second unit 200 may have the same configuration, and the illustrations and descriptions about the second unit 200 will be omitted.

The first unit 100 may include, but is not limited to, a plurality of routing circuits (RCs; torus routing circuits) 160 arranged in a matrix. The matrix arrangement is one in which constituent elements are arranged in each of a first direction and a second direction that is orthogonal to the first direction.

Torus routing (described below) is a form that can be adopted when the node modules 150 are connected in the form of a torus. In this case, compared to the case in which the node modules 150 are not connected as a torus form, the routing circuit 160 can use a lower hierarchal level in the OSI reference model.

The routing circuit 160 transfers packets that include data transferred from the connection module 140 or from another routing circuit 160, via a mesh network. The mesh network is a network formed in a form of a net or a matrix, that is, a network in which communication nodes are disposed at the intersection points of vertical lines and horizontal lines, the vertical and horizontal lines serving as communication paths. Each of the routing circuits 160 has at least two RC interfaces 161. Each of the routing circuits 160 is electrically connected to its neighboring routing circuit 160 via an RC interface 161.

The first manager 110 is electrically connected to each connection module 140 and to a predetermined number of routing circuits 160.

A node module 150 is electrically connected to its neighboring node module 150 via a routing circuit 160 and a packet manager (PMU) 180 (described below).

FIG. 3 shows an example of a rectangular network in which the node modules 150 are each disposed at each point of a matrix. In this case, the coordinates (x, y) of the matrix points are indicated in decimal notation. Position information of a node module 150 disposed at a matrix point is indicated by a relative node address $(x_D, Y_D)$ (in decimal notation) corresponding to the coordinates of that matrix point. In FIG. 3, the node module 150 located in the upper-left corner has the origin node address of (0, 0). The relative node addresses of each of the node modules 150 increase and decrease according to the change in the integer values in the horizontal direction (X direction) and the vertical direction (Y direction).

Each node module 150 is connected to node modules 150 that neighbor therewith in at least two different directions. For example, the node module 150 (0, 0) in the upper-left corner is connected, via a routing circuit 160, to the node module 150 (1, 0) neighboring in the X direction, to the node module 150 (0, 1) neighboring in the Y direction, which is different from the X direction, and to the node module 150 (1, 1) neighboring in the inclined direction.

Although the node modules 150 are shown as being arranged at matrix points of the rectangular matrix in FIG. 3, the arrangement of the node modules 150 is not restricted to that shown in FIG. 3. That is, it is sufficient that the matrix be a connection of node modules 150 neighboring in two more different directions, and this can be, for example, triangular, hexagonal, or the like. Also, although the node modules 150 are disposed in two dimensions in FIG. 3, the node modules 150 can be disposed in three dimensions. If a three-dimensional disposition is used, each node module 150 can be specified by the three values (x, y, z). If the node modules 150 are disposed in two dimensions, a torus connection can be made by joining node modules 150 with those at opposite side, in a wraparound fashion.

The torus configuration is a connection configuration in which the node modules 150 are connected in a circulating manner, so that a given node module 150 is connected in two directions, one being a path having a first direction, and the other being a path having a second direction that is opposite to the first direction.

In FIG. 3, the first unit 100 has the four connection modules from 140-1 to 140-4. Each connection module 140 is connected one-to-one with different routing circuits 160. In the course of processing a request from the client 400, when a node module 150 is accessed, a connection module 140 generates a packet that can be transferred or executed by the corresponding routing circuit 160, and the generated packet is transmitted to the routing circuit 160.

The number of connection modules 140 can configured arbitrarily. A plurality of routing circuits 160 may be connected to one connection module 140, and a plurality of connection modules 140 may be connected to one routing circuit 160.

The first interface 170 is electrically connected to the first manager 110 and the switch 410.

The second interface 171 is electrically connected to the routing circuits 160 and to the routing circuits of the other units (for example, the second unit 200). By establishing connections in this manner, the node modules of each unit are linked logically, enabling use as single memory.

In the storage system 1, a table for performing logical/physical conversion may be held in the first manager 110, in both the first manager 110 and the second manager 210, or in a manager of another unit 300. The method for performing logical/physical conversion may be a method of allocating arbitrary key information to physical addresses or a method of allocating physical addresses, which are a series of information, to logical addresses. The second interface 171 is electrically connected to one or more routing circuits 160 via an RC interface 161. In FIG. 3, RC interfaces 161, each of which is connected between two routing circuits 160, are connected to the second interface 171.

A power supply unit (PSU) 172 converts an external power supply voltage applied from an external power source to a prescribed DC voltage, and supplies the prescribed DC voltage to the constituent elements of the first unit 100 (or of the storage system 1). The external power source is, for example, a 100-V or 200-V AC power source or the like.

A battery backup unit (BBU) (auxiliary power supply apparatus, battery unit, auxiliary power supply unit) 173 has a secondary battery that stores electrical power supplied from the power supply unit 172. If the storage system 1 is electrically cut off from the external power source, the battery backup unit 173 supplies an auxiliary power supply voltage to the constituent elements of the first unit 100 (or of the storage system 1). The node controller (NC) 151 of the node module 150, which will be described below, performs backup processing to protect data using an auxiliary power supply voltage.

[Connection Modules]

Figure 4:
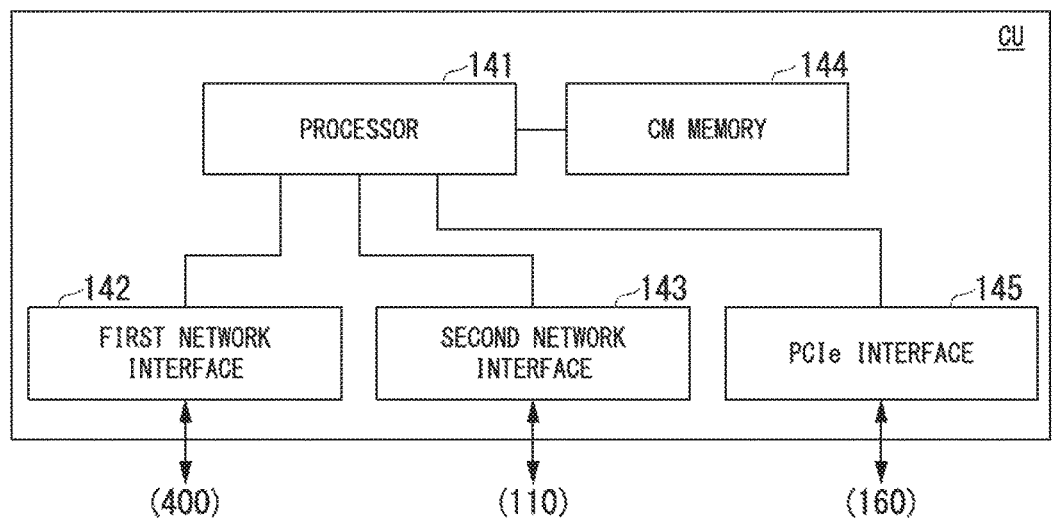
FIG. 4 shows a configuration of a connection module of the first (and second) unit.

FIG. 4 shows a configuration of the connection module 140. The connection module 240 has the same type of configuration, and the illustration and description about the connection module 240 will be omitted. The connection module 140 may include, but is not limited to, a processor 141 such as a CPU, a first network interface 142, a second network interface 143, a CM memory 144, and a PCIe interface 145. The processor 141 performs various processing by executing application programs, using the CM memory 144 as a working area. The first network interface 142 is a connection interface that connects to the client 400. The second network interface 143 is a connection interface that is connected to the first manager 110. The CM memory 144 is not a storage memory, but rather a memory that stores data temporarily. Although the CM memory 144 is, for example, a RAM, and various types of memory can be used alternatively. The PCIe interface 145 is a connection interface that is connected to the routing circuit 160.

[FPGA]

Figure 5:
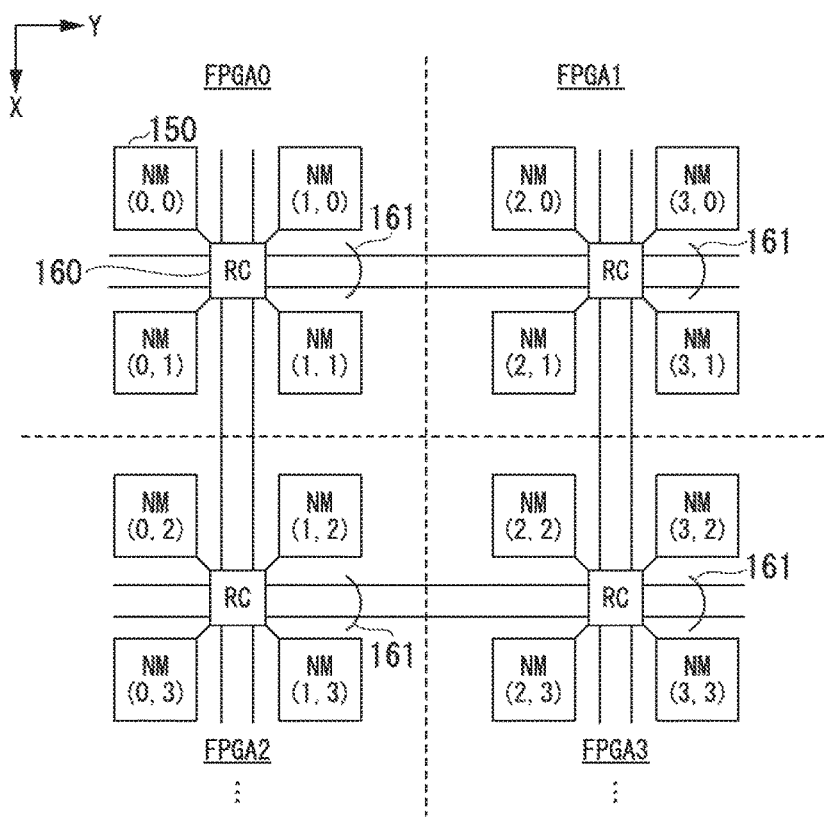
FIG. 5 shows a configuration of an array of field-programmable gate arrays (FPGA), each including node modules, in the first (and second) unit.

FIG. 5 shows a configuration of FPGAs (field-programmable gate array), each of which includes the node modules 150 (or the node modules 250). The first unit 100 or the second unit 200 may include, but is not limited to, a plurality of FPGAs that have one routing circuit 160 and four node modules 150 around it. In the example of FIG. 5, the first unit 100 has the four FPGAs from FGPA0 to FGPA3. For example, the FPGA0 has one routing circuit 160 and four node modules (0, 0), (1, 0), (0, 1), and (1, 1).

The addresses of each of the four FPGAs from FPGA0 to FPGA3 are, for example, (000, 000), (010, 000), (000, 010), and (010, 010) when expressed in binary notation.

The one routing circuit 160 and four node modules 150 of each FPGA are electrically connected via an RC interface 161 and a packet manager 180, which will be described below. The routing circuit 160, in the data transfer operation, performs routing, referencing the FPGA address destination x and destination y.

Figure 6:
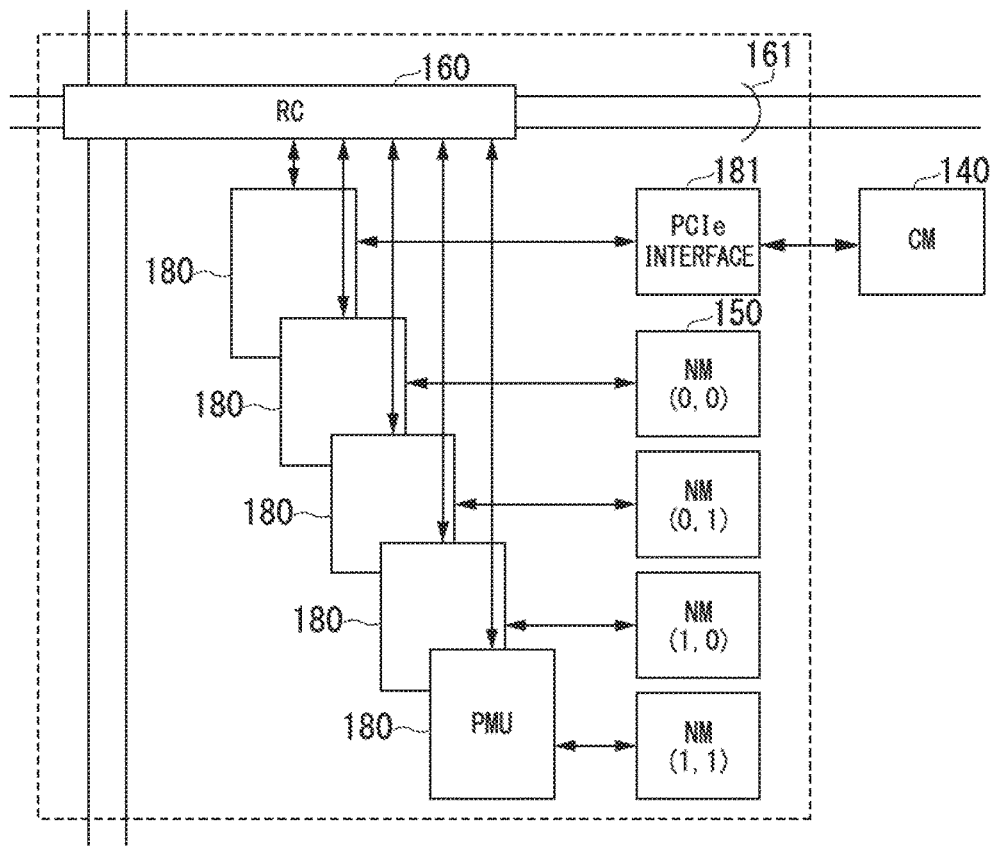
FIG. 6 shows a configuration of the FPGA according to the embodiments.

FIG. 6 shows a configuration of the FPGA. The configuration shown in FIG. 6 is common to FPGA0 through FPGA3. An FPGA has, for example, one routing circuit 160, four node modules 150, five packet managers (PMUs) 242, and a PCIe interface 181.

The packet managers 180 are provided in correspondence to the node modules 150 and examine packets transmitted by the connection module 140 and the routing circuit 160. The packet manager 180 determines whether or not the coordinates (relative node address) included in a packet coincide with its own coordinates (relative node address). If the packet manager 180 determines that the coordinates coded in the packet coincide with its own coordinates, the packet manager 180 transfers the packet directly to the node module 150 corresponding to the coordinates. If, however, the packet manager 180 determines that the coordinates coded in the packet and its own coordinates do not coincide (that is, they are different coordinates), a response to that effect is made to the routing circuit 160.

For example, if the node address of the ultimate target position is (3, 3), the packet manager 180 connected to the node address (3, 3) determines that the coordinates (3, 3) coded in the examined packet are its own coordinates (3, 3). For this reason, the packet manager 180 connected to the node address (3, 3) transmits the examined packet to the node module 150 connected to itself at the node address (3, 3). The transmitted packet is examined by the below-described node controller 151 of the node module 150. This causes the FPGA to perform, by the node controller 151, processing in accordance with the request coded in the packet, such as storing data into a storage memory in the node module 150.

The PCIe interface 181 examines requests, packets, and the like from the connection module 140 and also transmits the examined requests, packets, and the like to the packet manager 180. A packet transmitted to the packet manager 180 corresponding to the PCIe interface 181 is transferred to other node modules 150 via the routing circuit 160.

[Node Module]

Figure 7:
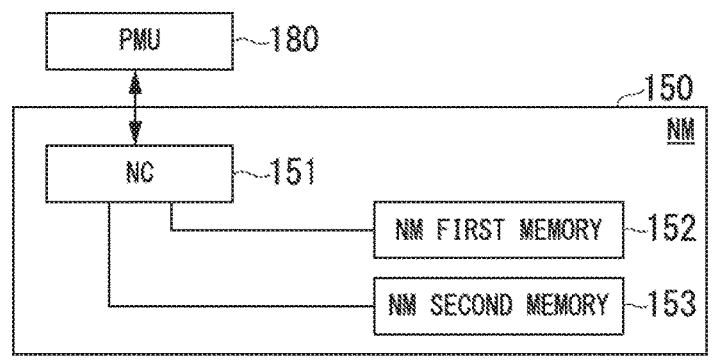
FIG. 7 shows a configuration of the node module according to the embodiments.

The node modules of the present embodiment will be described below. FIG. 7 shows a configuration of the node module 150. The node module 250 has the same configuration as the node module 150, and the illustration and description thereof will be omitted.

The node module 150 has a node controller 151, a NM first memory 152 that functions as a storage memory, and an NM second memory 153 that the node controller 151 uses as a working area.

The packet manager 180 is electrically connected to the node controller 151. The node controller 151 performs operations such as receiving a packet via the packet manager 180 from the connection module 140 or from another node module 150, and transmitting a packet via the packet manager 180 to the connection module 140 or another node module 150. If the packet addressee is its own node module 150, the node controller 151 executes processing corresponding to that packet (a command included in that packet). For example, if the command is an access command (a read command or a write command), the node controller 151 executes accessing to the NM first memory 152. If the addressee of the received packet is not its own node module 150, the node controller 151 transfers that packet to another node module 150 connected to its own node module 150.

The NM first memory 152 may be a NAND-type flash memory, a bit cost scalable (BiCS) memory, a magnetoresistive memory (MRAM), a phase-change memory (PcRAM), or a resistance random-access memory (RRAM (registered trademark) or combination thereof.

The NM second memory 153 is not a storage memory, but rather a memory that stores data temporarily. Various types of RAM, such as a DRAM (dynamic random-access memory) can be used as the NM second memory 153. If the NM first memory 152 also serves as a working area, the NM second memory 153 need not be disposed in the node module 150.

[Interface Standards]

The interface standards in the storage system of the present embodiment will be described below. In the present embodiment, an interface that electrically connects the above-noted constituent elements can be one of the standards described below.

A low-voltage differential signal standard (LVDS) or the like is applied to connection between the RC interface 161 and each routing circuit 160.

The PCIe (PCI Express) standard or the like is applied to connection between the routing circuit 160 and the connection module 140.

The LVDS and the JTAG (Joint Test Action Group) standard or the like are applied to connection between the routing circuit 160 and the second interface 171.

The above-noted PCIe standard and the I2C (Inter-integrated Circuit) standard are applied to the connection between the node module 150 and the First manager 110.

These interface standards are examples and, as necessary, other interface standards may be applied.

[Packet Content]

Figure 8:
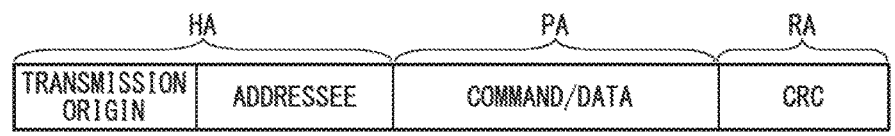
FIG. 8 shows a configuration of a packet transmitted in the storage system according to the embodiments.

FIG. 8 shows a configuration of a packet. The packets transmitted in the storage system 1 of the present embodiment includes a header area HA, a payload area PA, and a redundancy area RA.

The header area HA contains, for example, the X-direction and Y-direction addresses (from_x, from_y) of the transmission origin and the X-direction and Y-direction addresses (to_x, to_y) of the transmission destination.

The payload area PA contains, for example, a command or data and the like. The data size of the payload area PA is variable.

The redundancy area RA contains, for example, a CRC (cyclic redundancy check) code. The CRC code is a code (information) used to detect data errors in the payload area PA.

Upon receiving a packet having the above configuration, the routing circuit 160 determines the routing destination, based on a prescribed transfer algorithm. Based on the transfer algorithm, the packet is transferred from the routing circuit 160 and ultimately reaches the node module 150 of the destination node address.

For example, the routing circuit 160, based on the transfer algorithm, selects, as the transfer destination, node modules 150 on a path that has the minimum number of transfers from its own node module to the addressee node module 150. If, according to the transfer algorithm, a plurality of paths that has the minimum number of transfers from its own node module to the addressee node module 150 exists, the routing circuit 160 selects one of the plurality of paths, using an arbitrary method. In the same manner, if a node module 150 on the path that has the minimum number of transfers includes a fault or is busy, the routing circuit 160 selects node modules 150 along a different path as the transfer destination.

Since a plurality of node modules 150 is logically connected in a mesh network configuration, a plurality of paths having a minimum number of packet transfers may exist. In such cases, even if a plurality of packets having a specific node module 150 as a destination are output, the plurality of output packets is distributed and transferred through a plurality of paths according to the transfer algorithm. This avoids concentration of accesses to a specific node module 150 and suppresses a reduction in the overall throughput of the storage system 1.

[Overall Management]

The processing carries out when the sub-master manager becomes the master manager and performs the overall management will be described below. The first manager 110 and the second manager 210 in the present embodiment repeatedly transmit heartbeat signals to mutually verify whether they are operating normally. The heartbeat signals include a heartbeat request signal that requests a response and a heartbeat response signal returned in response to the heartbeat request signal.

In the present embodiment, the heartbeat request signal may be transmitted in the packet format such as shown in FIG. 8. The heartbeat request signal can be recognized as a heartbeat request signal by a manager that receives it. The heartbeat request signal may include, but it is not limited to, information indicating the transmission origin, information indicating that it is a heartbeat request signal, and identification information of the signal itself. The heartbeat request signal may also include information (a value) indicating that is the basis for information to be included in the heartbeat response signal. The information indicting the transmission source may be included in the header area HA or the payload area PA, of the signal.

In the present embodiment, the heartbeat response signal may be transmitted in the packet format such as shown in FIG. 8. By receiving the heartbeat response signal, a manager can recognize that the signal is a response to a heartbeat request signal that it had transmitted. The heartbeat response signal may include, but it is not limited to, information indicting the transmission origin, information indicating that it is a heartbeat response signal, and information indicating to which heartbeat request signal the heartbeat response signal is responding (for example, the identification information of the heartbeat request signal). The heartbeat response signal may also include the result of performing prescribed processing with respect to information included in the heartbeat request signal. The information indicating the transmission origin may be included in the header area HA or the payload area PA, of the signal.

Figure 9:
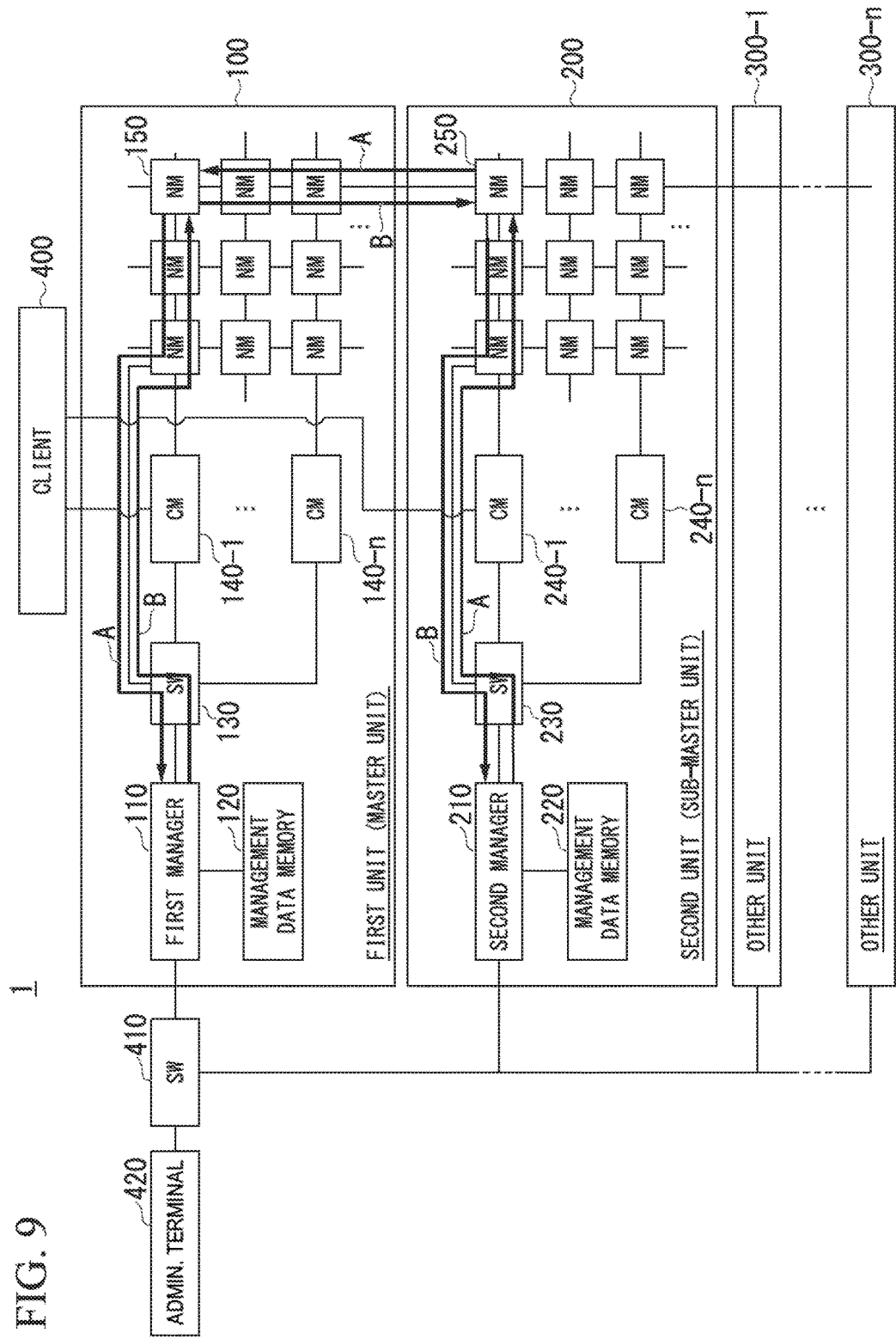
FIG. 9 shows paths of a heartbeat signal transmitted in the storage system according to the embodiments.

FIG. 9 shows paths through which heartbeat signals are transmitted. In FIG. 9, the arrows A indicate the heartbeat request signal transmitted from the second manager 210 to the first manager 110, and the arrows B indicate the heartbeat response signal returned from the first manager 110 to the second manager 210. Upon receiving the heartbeat request signal, the first manager 110 returns the heartbeat response signal to indicate to the second manager 210 that the first manager 110 is in a normal state. The normal state may be a state in which no abnormality occurred in functions required for the overall management, where typical examples of the functions required for the overall management may include, but is not limited to, the signal processing functions, computation functions, and communication functions.

As shown in FIG. 9, the heartbeat signals are transmitted through a communication path (first communication path) used for communication between the node module 150 and the node module 250. The transmission of the heartbeat signals through the first communication path enables the second manager 210 to detect accurately whether or not the first manager 110 is in an abnormal state, even if the abnormality has occurred in a communication path (second communication path) between the first and second managers 110 and 210 via the switch 410. As a result, the second manager 210 can properly determine whether or not it is necessary to execute the overall management in place of the first manager 110.

The heartbeat signals are transmitted without passing through the connection modules 140 or the connection modules 240. This transmission enables the storage system 1 to avoid an increase processing load on the connection modules that relay the heartbeat signals. Because the connection modules function as interfaces with respect to the client 400, the processing load on the connection modules would otherwise increase. For this reason, in the storage system 1, by transmitting the heartbeat signals without passing through the connection modules, it is possible to prevent the processing load on the connection modules from increasing due to relaying of the heartbeat signals.

The second manager 210 that serves as the sub-master manager determines whether or not the first manager 110, which serves as the master manager, is in an abnormal state, based on the transmission/receiving status of heartbeat signals, and, in a case that the second manager 210 determines that the first manager 110 is in the abnormal state, the second manager 210, in place of the first manager 110, executes the overall management.

The transmission/reception statuses of the heartbeat signals may include the following statuses.

(1) A state in which the second manager 210 can receive both a heartbeat response signal that is responded normally to a heartbeat request signal originated from the second manager 210 and a heartbeat request signal from the first manager 110: A normally responded heartbeat response signal is a heartbeat response signal that is generated in response to a heartbeat request signal, in accordance with a rule established beforehand between the first manager 110 and the second manager 210. For example, the rule may require that a heartbeat response signal include a value that is 1 greater than a value included in the heartbeat request signal. In this case, the second manager 210 on the receiving side of the heartbeat response signal can determine whether or not the heartbeat response signal is a normal response to the heartbeat request signal, by comparing the value included in the heartbeat request signal transmitted by the second manager 210 itself and the value included in the heartbeat response signal.

(2) A state in which the second manager 210 can receive the heartbeat response signal that responded normally to a heartbeat request signal originated from the second manager 210, but not a heartbeat request signal from the first manager 110.

(3) A state in which the second manager 210 cannot receive the heartbeat response signal that responded normally to the heartbeat request signal originated from the second manager 210, but can receive a heartbeat request signal from the first manager 110.

(4) A state in which the second manager 210 cannot receive both the heartbeat response signal that responded normally to the heartbeat request signal originated from the second manager 210 and a heartbeat request signal from the first manager 110.

Of the above-noted cases (1) to (4), the second manager 210 determines that the first manager 110 is in an abnormal state in at least the case of (4). The abnormal state may be, but is not limited to, a state in which abnormality occurred in any function required for the overall management, where typical examples of the function required for the overall management may include, but is not limited to, the signal processing functions, computation functions, and communication functions.

The first manager 110 in the abnormal state, for example, cannot return a heartbeat response signal normally. In this case, the first manager 110 can either not return a heartbeat response signal because of the abnormality in the communication function, or cannot generate a heartbeat response signal as a normal response because of the abnormality in the signal processing function. When, even though the first manager 110 in the abnormal state can return a heartbeat response signal as a normal response, it determines that it cannot itself execute the overall management normally, the first manager 110 may not return a heartbeat response signal or may return a heartbeat response signal with erroneous content. As a result, the second manager 210 can determines whether or not the first manager 110 is in the abnormal state.

In the case of (2) or (3), if the second manager 210 determines the first manager 110 to be in the abnormal state, the second manager 210 may execute the overall management in place of the first manager 110, and if it is doubtful as to whether the first manager 110 is in the abnormal state, the second manager 210 may not execute the overall management in place of the first manager 110.

The storage system 1 may be configured such that the heartbeat request signal is transmitted only from the second manager 210 (sub-master manager) and the first manager 110 (master manager) does not transmit the heartbeat request signal, but only returns the heartbeat response signal. In this case, the second manager 210 determines that the first manager 110 is in an abnormal state when the second manager 210 cannot receive the heartbeat response signal responded normally to the heartbeat request signal originated from the second manager 210.

The heartbeat signals may be transmitted redundantly through the second communication path. In this case, if both transmissions of the heartbeat signals through the first and second communication paths are not performed normally, the second manager 210 may determine that the first manager 110 is in an abnormal state. This enables the second manager 210 to perform the state verification redundantly, enabling the second manager 210 to more reliably determine whether or not it is necessary to execute the overall management in place of the first manager 110.

Figure 10:
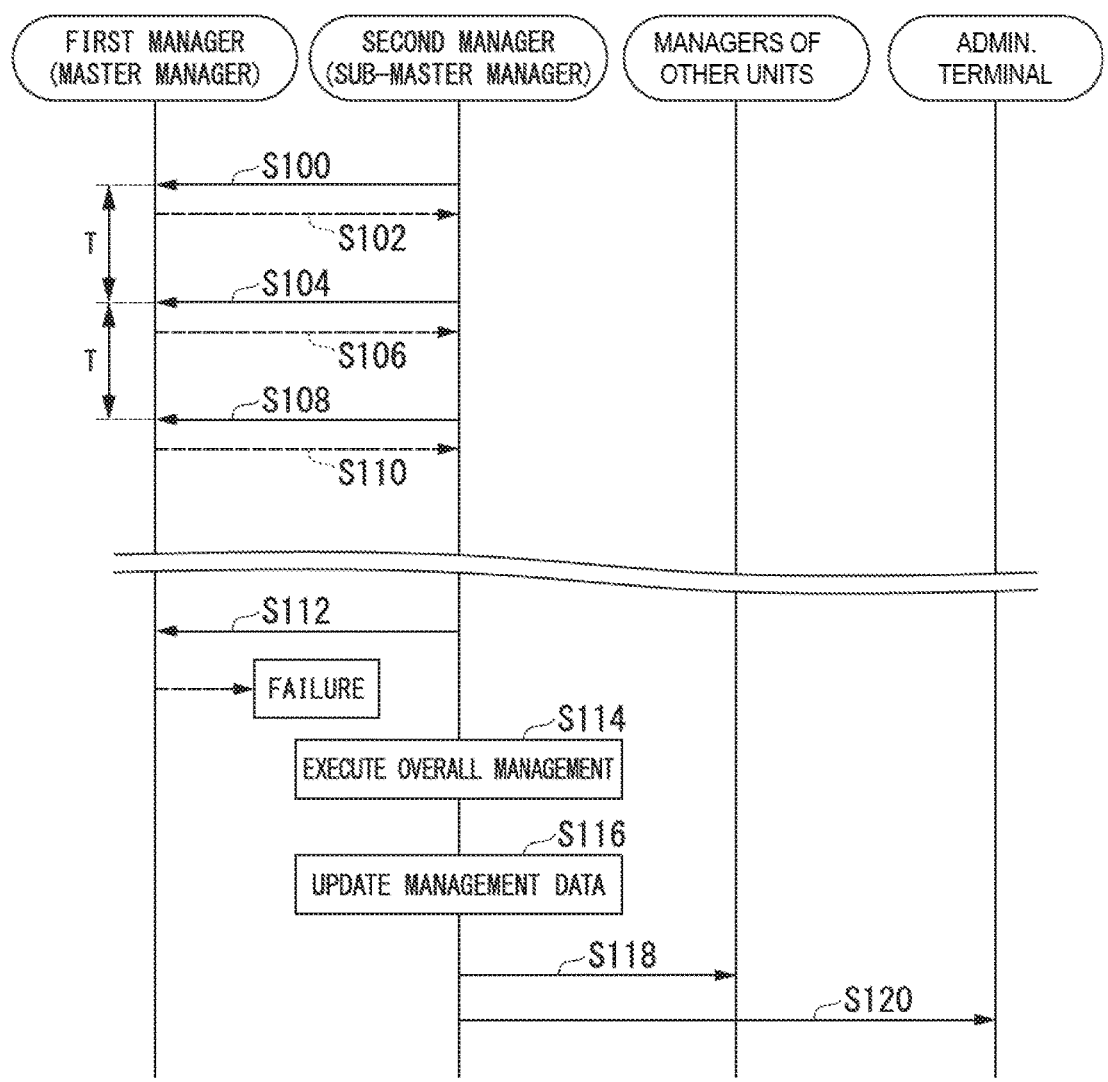
FIG. 10 is a sequence diagram of processing performed when a second manager of the storage system executes overall management in place of a first manager of the storage system.

FIG. 10 is a sequence diagram of processing performed when the second manager 210 executes the overall management in place of the first manager 110. The second manager 210 repeatedly transmits a heartbeat request signal to the first manager 110 at a time interval of T (steps S100, S104, S108, and S112). The first manager 110 returns a heartbeat response signal with respect thereto (steps S102, S106, and S110).

If the first manager 110 goes into an abnormal state when the heartbeat request signal is transmitted at step S112, the heartbeat response signal that is responded normally thereto cannot be received by the second manager 210. In this case, the second manager 210 decides that it will execute the overall management in place of the first manager 110 (step S114) and updates management data (step S116). The second manager 210, for example, changes the master flag MF included in the management data from the value of 0, which indicates as not being set as the master manager, to the value of 1, which indicates as being set as the master manager.

The second manager 210 notifies the managers of the other units 300 that the second manager 210 has become the master manager (step S118). The second manager 210 also notifies the administrator terminal 420 that since the first manager 110 is in an abnormal state, the second manager 210 has become the master manager (step S120).

The administrator terminal 420, upon being notified from the second manager 210 that the first manager 110 is in an abnormal state, displays an image based on the notification information and calls it to the attention of the administrator. As a result, the administrator is promoted to take actions, such as reset of the first manager 110 or replacement of hardware such as a processor and the management data memory 120. As a result of these actions, the first manager 110 can be restored to the normal operating state. The processing related to this restoration is described below.

[Restoration at the Time of Launching]

Figure 11:
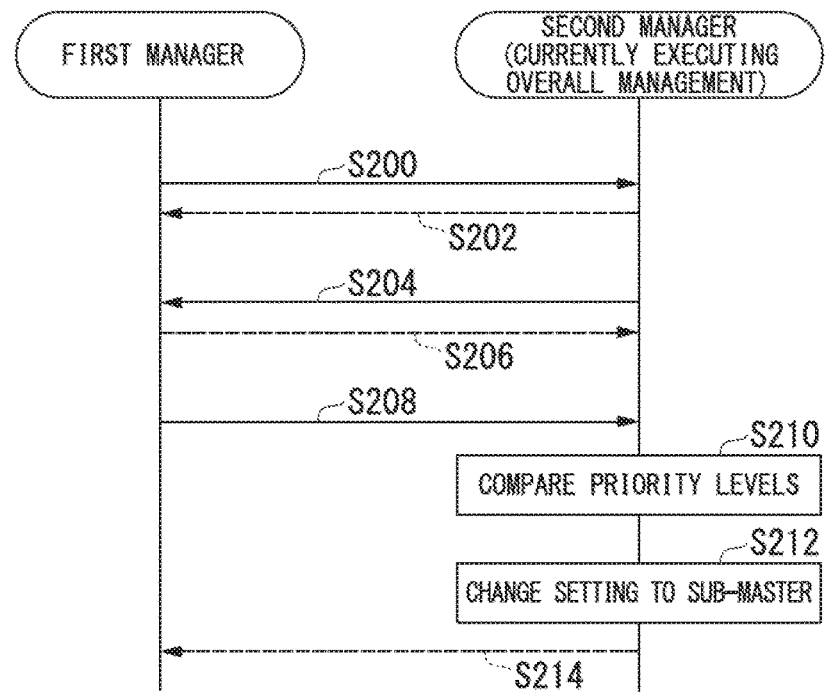
FIG. 11 is a sequence diagram of processing performed when the first manager is restored upon launching of the storage system.

FIG. 11 is a sequence diagram of processing performed when the first manager 110 is restored upon launching of the storage system 1.

First, the first manager 110 sends an inquiry of whether or not the second manager 210 is set as the master manager, to the second manager 210 (step S200). The second manager 210 references its own master flag MF stored in the management data memory 220 and transmits a response that the second manager 210 is set as the master manager (step S202).

Similarly, the second manager 210 sends an inquiry of whether or not the first manager 110 is set as the master manager, to the first manager 110 (step S204). The first manager 110 references its own master flag MF stored in the management data memory 120 and transmits a response that the first manager 110 is set as the master manager (step S206).

Next, the first manager 110 transmits information of the priority level PR set in the management data memory 120, to the second manager 210 (step S208). Upon receiving the information of the priority level PR from the first manager 110, the second manager 210 compares its own priority level PR stored in the management data memory 220 with the received priority level PR (step S210). For example, when the priority level PR of the first manager 110 is set higher, the second manager 210 changes the setting from the master manager to the sub-master manager (step S212). In this case, the second manager 210 changes the master flag MF in the management data from the value of 1, which indicates as being set as the master manager, to the value of 0, which indicates as not being set as the master manager. The second manager 210 then transmits to the first manager 110 information that the setting has been changed from the master manager to the sub-master manager (step S214).

In this manner, if the first manager 110 is restored upon the launching of the storage system 1, the first manager 110, which previously had a priority level PR set higher, is restored as the master manager. This enables the storage system 1 to return to a state that is not seen by the manager to be abnormal.

That is, even if there is a master flag MF conflict in the storage system 1, the master manager is determined further based on the priority level PR. As a result, even if the master flag MF is set to 1 in a plurality of managers, because of user errors, it is possible to properly set the master manager and start operation. Here, the "master flag MF conflict" refers to a situation in which the master flag MF of the first manager 110 and that of the second manager 210 are both set to 1.

If there is a conflict between both the master flags MF and the priority levels PR, the first manager 110 and the second manager 210 reference each other's IP address (communication address), and, for example, processing may be performed to establish the master manager as the manager having the smaller last digit thereof. Here, the "conflict between priority levels PR" refers to a situation in which the priority levels PR of the first manager 110 and that of the second manager 210 are the same.

[Restoration During Operation]

Figure 12:
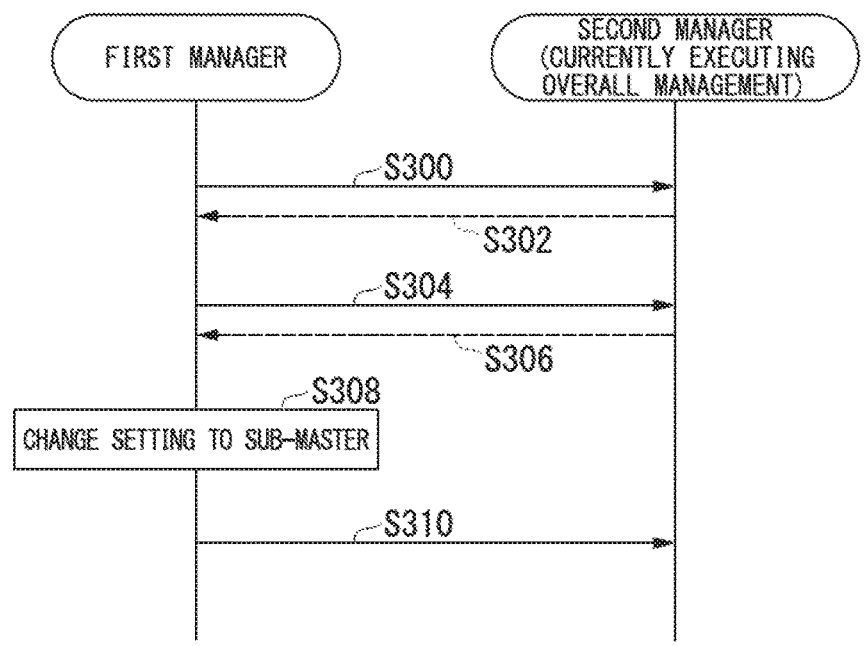
FIG. 12 is a sequence diagram of processing performed when the first manager is restored while the storage system is operating.

FIG. 12 is a sequence diagram of processing performed when the first manager 110 is restored while the storage system 1 is operating.

First, the first manager 110 sends an inquiry of whether or not the second manager 210 is set as the master manager, to the second manager 210 (step S300). The second manager 210 references its own master flag MF stored in the management data memory 220 and transmits a response that the second manager 210 is set as the master manager (step S302).

Next, the first manager 110 sends information of the priority level PR set in the management data memory 120, to the second manager 210 (step S304). The second manager 210 transmits a response to that it will continue processing as the master manager because the storage system 1 is operating (step S306).

Upon receiving the response at step S306, the first manager 110 changes the setting from the master manager to a sub-master manager (step S308). For example, the first manager 110 changes the master flag MF in the management data from the value of 1, which indicates as being set as the master manager, to the value of 0, which indicates as not being set as the master manager. The first manager 110 then transmits to the second manager 210 information that it accepts that the second manager 210 continues processing as the master manager (step S310).

By performing control in this manner, it is possible to prevent the processing to change the master manager from causing errors in the normal operation of the storage system 1.

[Monitoring Communication Log]

Figure 13:
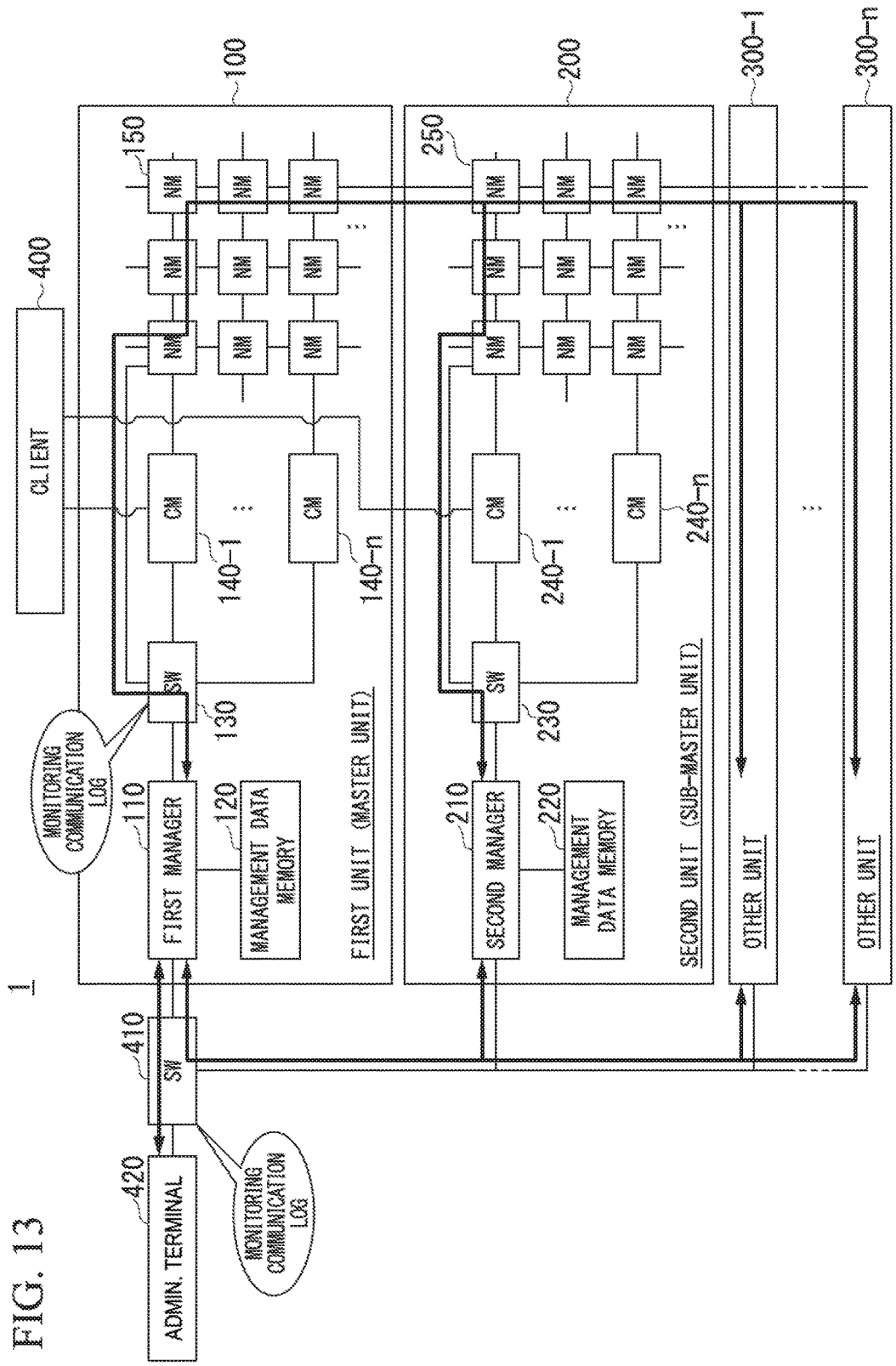
FIG. 13 shows paths used for monitoring communication when the first management operates as a master manager.

FIG. 13 shows paths used for monitoring communication when the first manager 110 operates as the master manager. The monitoring communication is communication to carry out the overall management, for the purpose of inquiring the state of other units 300, or notifying the administrator terminal 420 of the state of the storage system 1. In such cases, the switch 410 transfers data (for example, a packet)

from the first manager 110 as a transmission origin to the administrator terminal 420 or the managers of the other units as the addressees. The switch 410 generates a communication log by carrying out mirroring processing or the like and accumulates monitoring communication logs.

The mirroring processing is refers to processing to copy a packet that is being transmitted and received at a specific port of a switch to another port thereof. Having been copied to another port, the packet is transmitted to an arbitrary memory region to manage the monitoring communication logs. The subject to be copied may be only the header area HA of a packet, rather than the entire packet.

FIG. 14 shows a structure of a monitoring communication log. As is illustrated, the monitoring communication log is, for example, information of the transmission origin and information of the addressee, associated with the communication time (time of receiving and/or time of transmission). The transmission origin information and the addressee information in the monitoring communication log are, for example, IP addresses or MAC (media access control) addresses.

The switch 130 transfers data (for example, a packet) from the first manager 110 as the transmission origin to various units of the storage system 1 as the addressees. The switch 130 accumulates monitoring communication logs, similarly to the switch 410.

Figure 15:
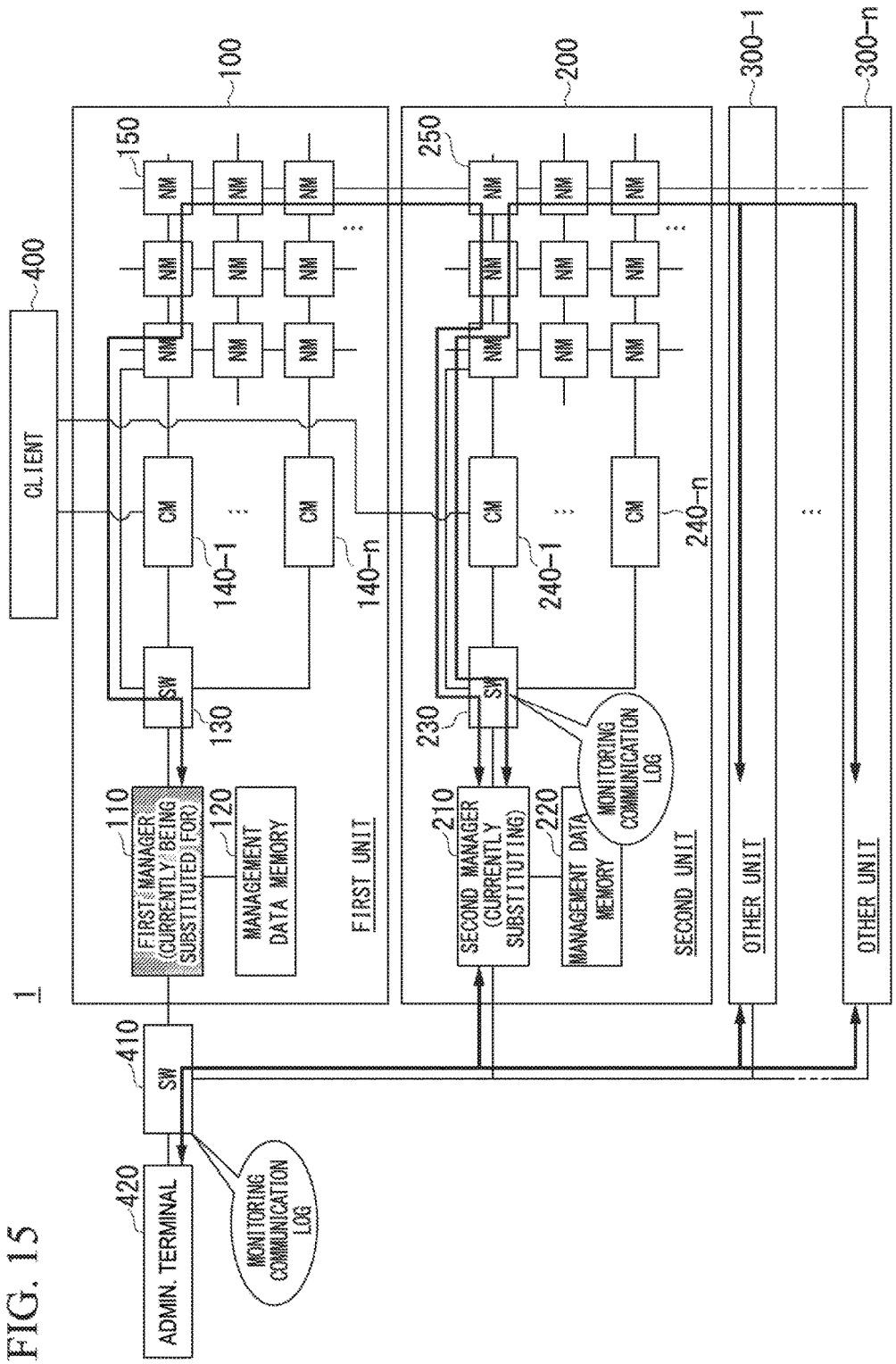
FIG. 15 shows paths used for the monitoring communication when the second manager serves as the master manager and executes the overall management.

FIG. 15 shows paths used for the monitoring communication when the second manager 210 serves as the master manager and executes the overall management. In this case, the switch 410 transfers data (for example, a packet) from the second manager 210 as the transmission origin to the administrator terminal 420 or managers of other units 300 as the addressees. The switch 410 generates communication logs by carrying out the mirroring processing and accumulates the monitoring communication logs. In the same manner, the switch 230 transfers data (for example, a packet) from the second manager 210 as the transmission origin to various units in the storage system 1 as the addressees. The switch 230 accumulates monitoring communication logs, similarly to the switch 410.

By referring to the monitoring communication logs collected by switches that transfer communication either within the storage system 1 or with the outside, it is possible to verify whether or not the second manager 210 is executing the overall management in place of the first manager 110. Also, by referring to the receiving history of the administrator terminal 420, it is possible to verify whether or not the second manager 210 is executing the overall management in place of the first manager 110.

Here, if the operation of the switch 410 is stopped, as long as the heartbeat signal can be normally received via the first communication path, there should be no state in which the second manager 210 executes the overall management in place of the first manager 110. By verifying this state and verifying that, when the operation of the first manager 110 is stopped, the second manager 210 starts to be engaged in executing the overall management in place of the first manager 110, it is possible to monitor whether or not the second manager 210 properly determines the abnormal state of the first manager 110.

[Other Configurations]

The storage system 1 may be configured without either one or both of the switch 410 that is connected between managers and the switches within a unit.

Figure 16:
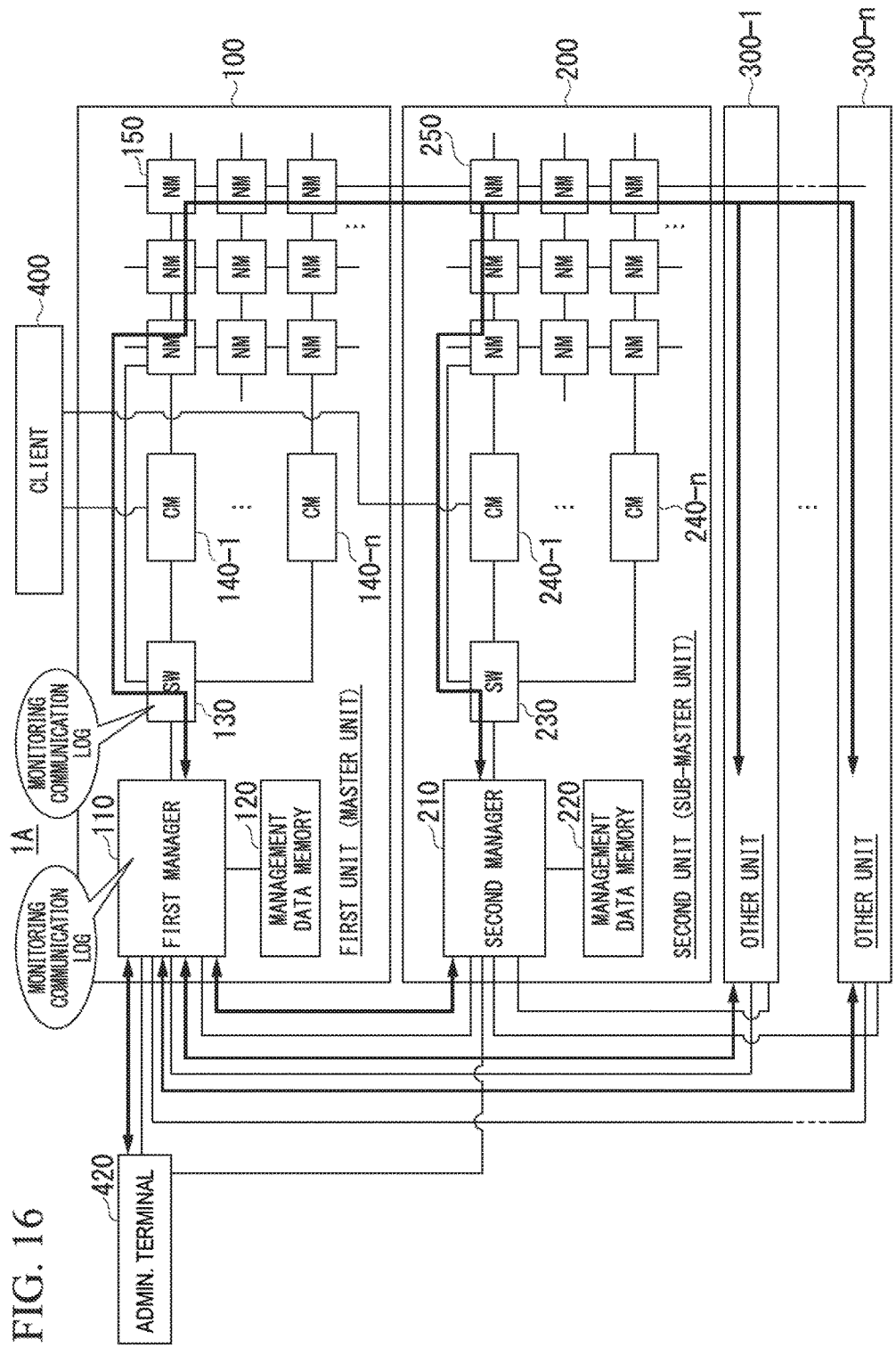
FIG. 16 shows a configuration of a storage system that does not include a switch between managers, and paths used for the monitoring communication.

FIG. 16 shows a configuration of a storage system 1A, which does not include the switch 410 between the managers and paths used for the monitoring communication. In this case, the first manager 110, which is the master manager, transmits data (for example, a packet) to the administrator terminal 420 and the second manager 210 or managers of other units 300, switching ports of the first manager 110. In this case, the monitoring communication logs accumulated by the switch 410 in FIG. 13 are accumulated in the first manager 110.

Figure 17:
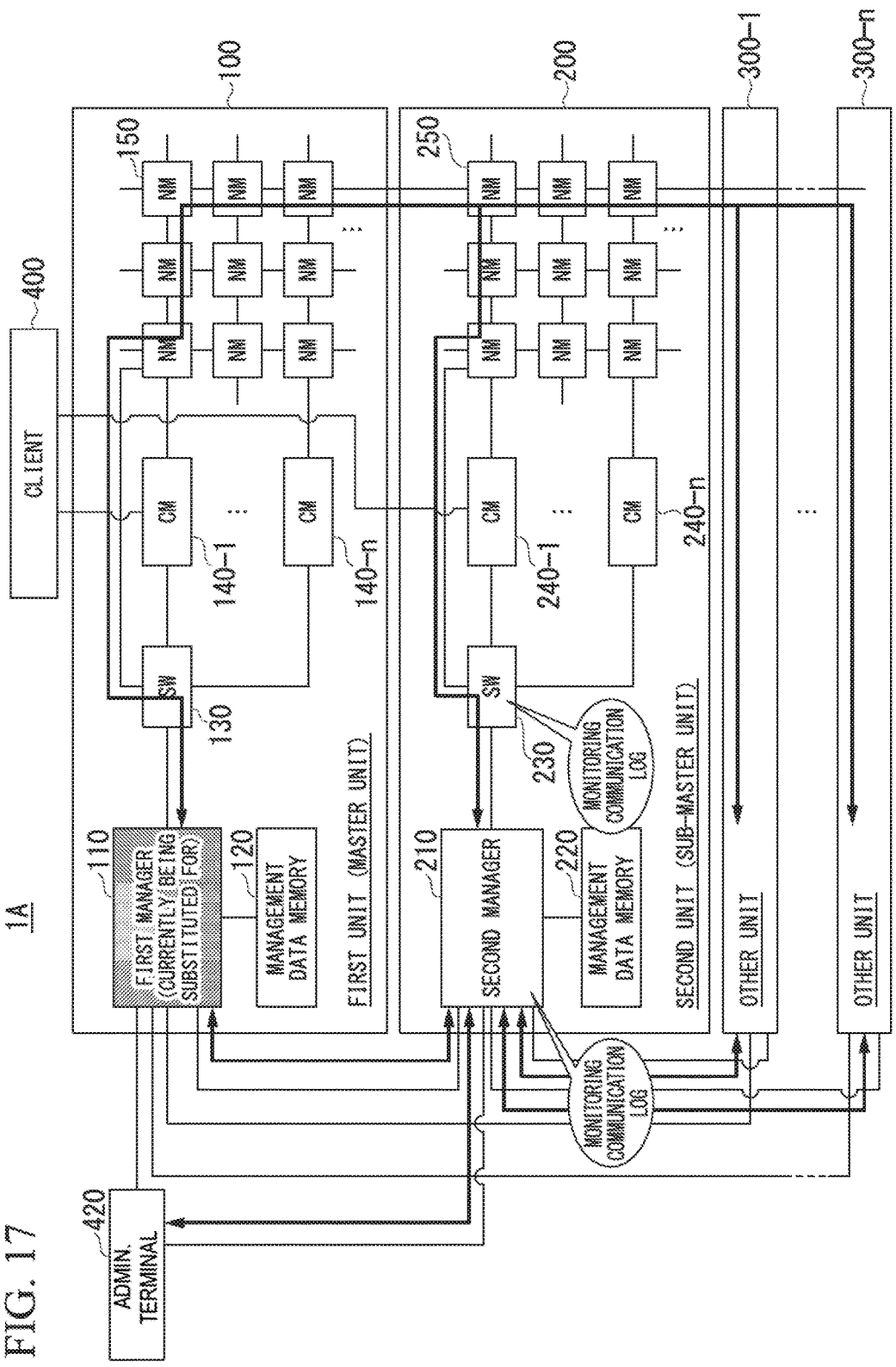
FIG. 17 shows paths used for the monitoring communication when the second manager is the master manager and executes the overall management, in the storage system shown in FIG. 16.

FIG. 17 shows paths used for the monitoring communication when, in the storage system 1A, the second manager 210 is the master manager and executes the overall management. In this case, the second manager 210, as a transmission origin, transmits data (for example, a packet) to the administrator terminal 420 or the managers of the other units as the addressees. The second manager 210 accumulates monitoring communication logs of communication it has performed. In the same manner, the switch 230 transfers data (for example, a packet) from the second manager 210 as the transmission origin to various units within the storage system 1 as the addressees. The switch 230 also accumulates the monitoring communication logs. By referencing these monitoring communication logs, it can be recognized that the second manager 210 is performing the overall management in place of the first manager 110.

Figure 18:
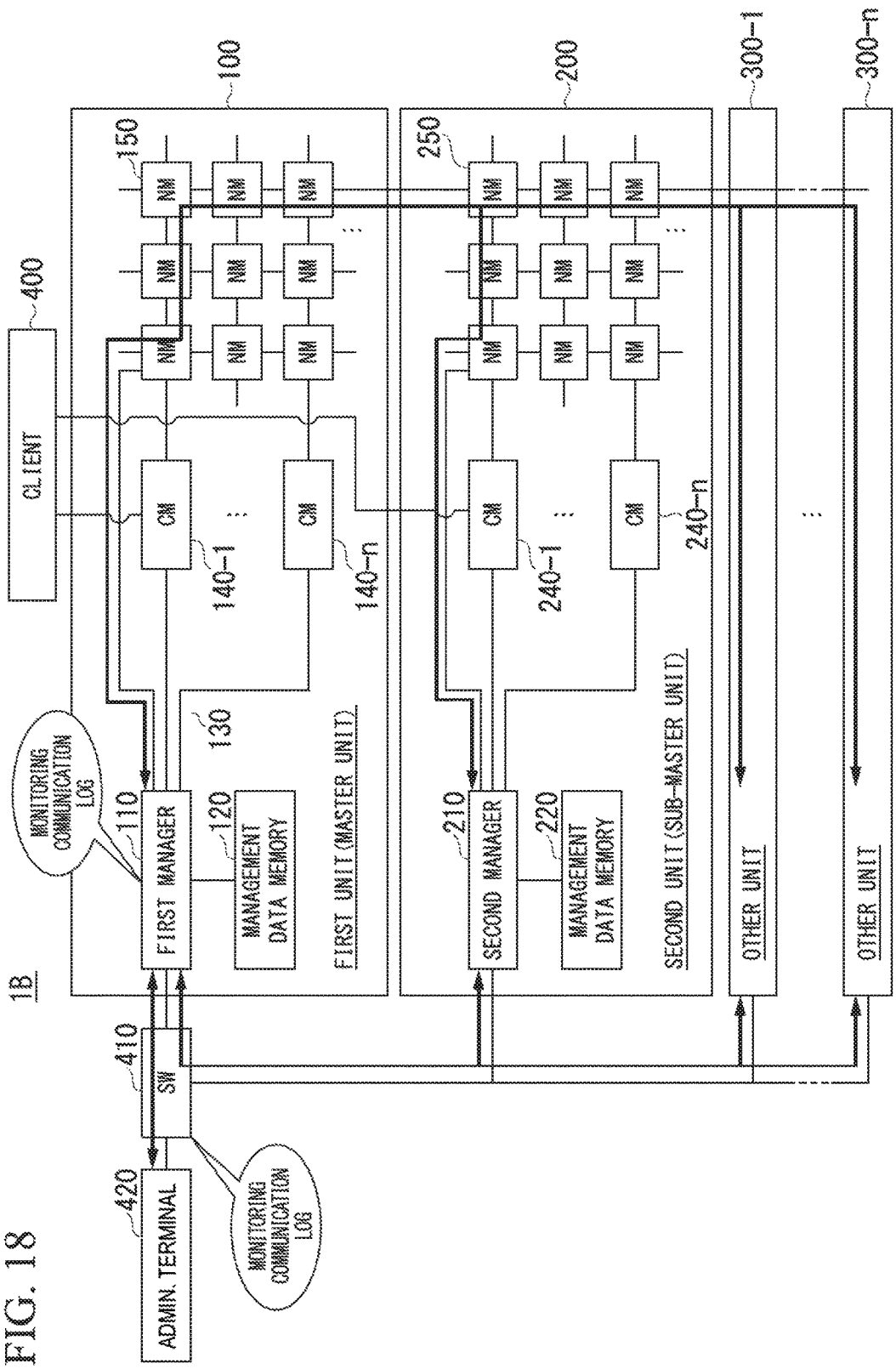
FIG. 18 shows a configuration of a storage system that does not include switches within the first and second units, and paths used for monitoring communication.

FIG. 18 shows a configuration of a storage system 1B that does not include the switches (i.e., 130 and 230) within each of the first and second units 100 and 200 and paths used for the monitoring communication. In this case, the first manager 110, which is the master manager, transmits data (for example, a packet) to the connection module 140 or to the node module 150, by switching ports thereof. In the same manner, the second manager 210, which is the sub-master manager, transmits data (for example, a packet) to the connection module 240 or the node module 250, by switching the ports. In this case, the monitoring communication logs accumulated by the switch 130 in the example of FIG. 13 are accumulated by the first manager 110.

Figure 19:
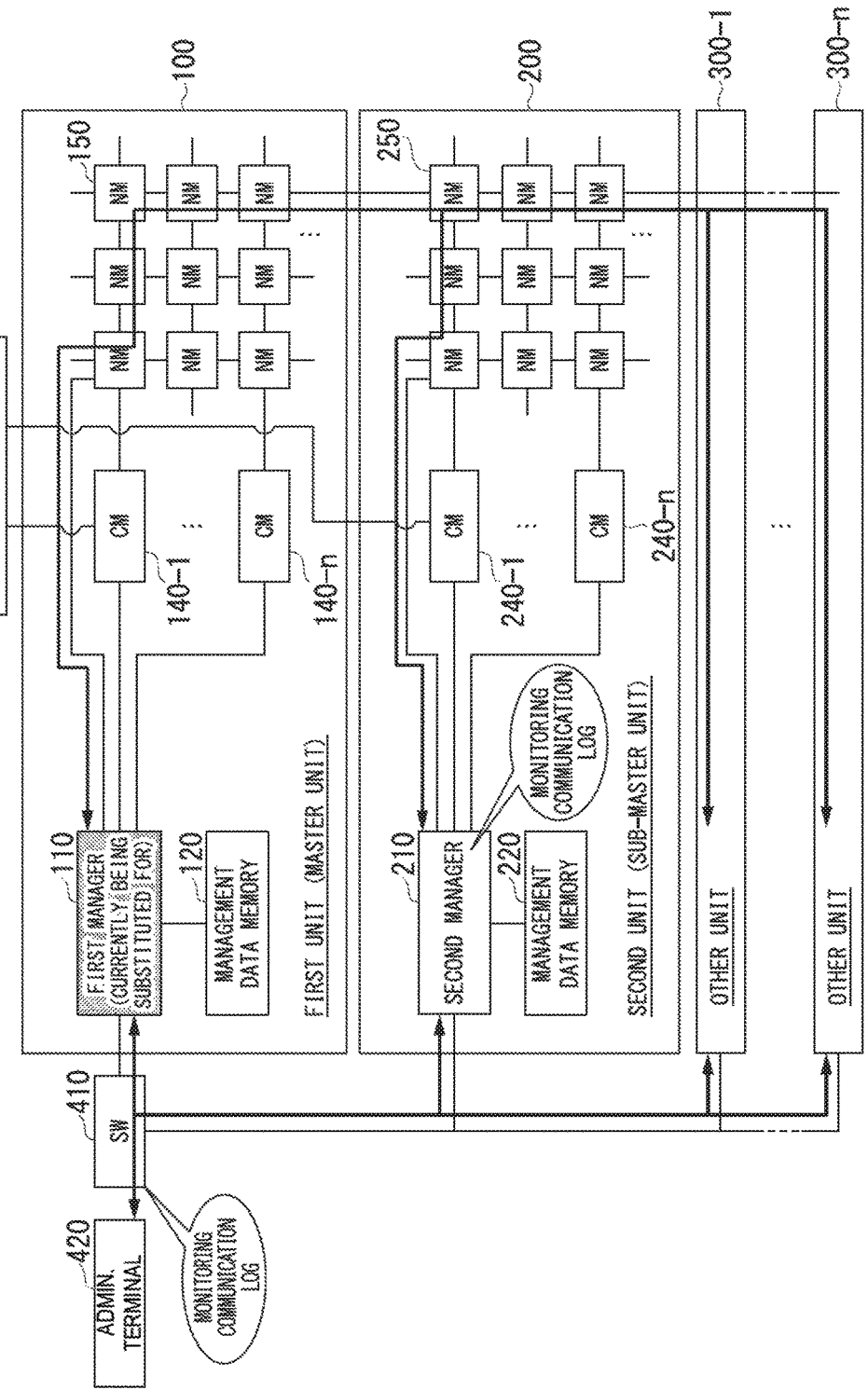
FIG. 19 shows paths used for the monitoring communication when the second manager is the master manager and executes the overall management, in the storage system shown in FIG. 18.

FIG. 19 shows paths used for the monitoring communication when, in the storage system 1B, the second manager 210 is the master manager and executes the overall management. In this case, the switch 410 transfers data (for example, a packet) from the second manager 210 as the transmission origin to the administrator terminal 420 or managers of the other units as the addressees. The switch 410 accumulates monitoring communication logs. Also, the second manager 210, as a transmission origin, transmits data (for example, a packet) to various units within the storage system 1 as the addressees. The second manager 210 accumulates monitoring communication logs of communication. By referencing these monitoring communication logs, it can be recognized that the second manager 210 is performing the overall management in place of the first manager 110.

Figure 20:
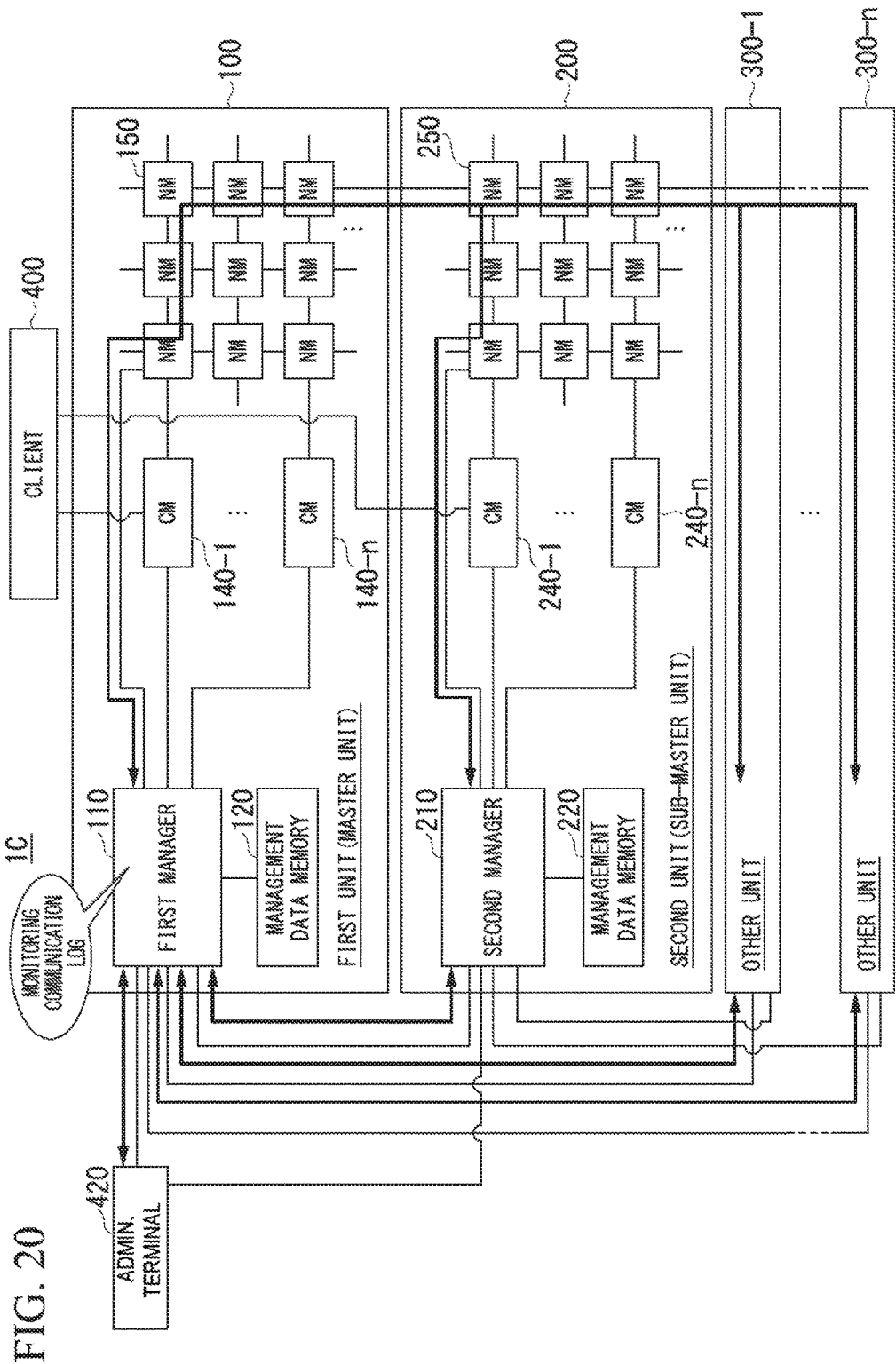
FIG. 20 shows a configuration of a storage system that does not include a switch between managers and switches within first and second units, and paths used for monitoring communication.

FIG. 20 shows a configuration of a storage system 1C that does not include the switch 410 between the managers and the switches within the first and second units 100 and 200 (for example, 130 and 230) and paths used for the monitoring communication. In this case, the first manager 110, which is the master manager, transmits data (for example, a packet) to the administrator terminal 420 and the second manager 210 or managers of the other units 300, by switching ports thereof. The first manager 110 also transmits data (for example, a packet) to the connection module 140 or the node module 150, by switching the ports. In the same manner, the second manager 210, which is the sub-master manager, transmits data (for example, a packet) to the connection module 240 or the node module 250, by switching ports thereof. In this case, the monitoring communication logs accumulated by the switch 410 and the switch 130, respectively, in the example of FIG. 13, are accumulated by the first manager 110.

FIG. 21 shows paths used for monitoring communication when, in the storage system 1C, the second manager 210 is the master manager and executes the overall management. In this case, the second manager 210, as the transmission origin, transmits data (for example, a packet) to the administrator terminal 420 or the managers of the other units as the addressees. The second manager 210 also transmits data (for example, a packet) to various units within the storage system 1 as the addressees. The second manager 210 accumulates monitoring communication logs of communication it has performed. By referencing these monitoring communication logs, it can be recognized that the second manager 210 is performing the overall management in place of the first manager 110.

In the above embodiments, the storage system 1 may have two or more sub-master units.

Further, the first manager 110, the second manager 210, and other managers may be implemented not by storing a program such as an operating system in an SD card, but rather by reading in a boot loader from a ROM (read-only memory) and executing a program stored in one of the node modules. In this case, the boot loader specifies the address in the node module. Data such as management data that might be overwritten is stored in a node module.

Communication in the storage system 1 may be performed wirelessly.

According to at least one embodiment described above, by communicating through the first communication path that is used when the node module 150 and the node module 250 communicate, the second manager 210 determines whether or not the first manager 110 is in an abnormal state and, if the first manager 110 is determined to be in an abnormal state, the second manager 210 executes the overall management of the storage system 1 in place of the first manager 110, so that even if the abnormality occurs in the communication path for communication between the first manager 110 and the second manager 210 without passing through the node modules, it is possible to reliably sense whether or not the abnormality has occurred in the first manager 110. As a result, the second manager 210 can make a proper judgment of whether or not it is necessary to perform the overall management in pace of the first manager 110.

The embodiments described above are illustrative embodiments of the following aspects of the storage system.

In some aspects, a storage system may include, but is not limited to, a first manager that executes management of the storage system comprising a storage memory; and a second manager that, based on communication to the first manager, verifies the state of the first manager and, the second manager based on the state of the first manager, executes management of the storage system in place of the first manager.

In other aspects, a storage system may include, but is not limited to, a plurality of node modules, each of which comprises a storage memory, and that communicate with each other; and a plurality of managers that change which one of the plurality of managers is to execute management of the storage system, based on communication from the one of the plurality of managers to another one of the plurality of managers through a communication path to be used for communication among the plurality of node modules. In those aspects, the one of the plurality of managers and the other one of the plurality of managers may respectively be the second manager and the first manager in the illustrative embodiments described above.

In still other aspects, a storage system may include, but is not limited to a first node module comprising a first storage memory; a first manager that executes a first processing for managing the first node module and that executes a second processing for managing the storage system; a first communication network that mutually connects the first manager and the first node module; a second node module comprising a second storage memory; a second manager that manages the second node module; a second communication network that mutually connects the second manager and the second node module; and a third communication network that connects the first node module and the second node module. The second manager, based on communication to the first manager through the third communication network, verifies the state of the first manager and, the second manager based on the state of the first manager, executes the second processing in place of the first manager. The third communication network may be the communication path which connect between the node module 150 and the node module 250 in the illustrative embodiments described above.

While certain embodiments have been described, these embodiments have been presented by way of example only, and are not intended to limit the scope of the inventions. Indeed, the novel embodiments described herein may be embodied in a variety of other forms, and various omissions, substitutions and changes in the form of the embodiments described herein may be made without departing from the spirit of the inventions. The accompanying claims and there equivalents are intended to cover such forms or modifications as would fall within the scope and spirit of the invention.

What is claimed is:
1. A storage system, comprising:
a first storage unit including a first processor and a first array of node modules forming a grid arrangement in a first direction and a second direction that intersects the first direction, each node module including a memory chip and a node controller, the node controller being configured to transfer a packet including data to and from a node module in the first array adjacent in the first direction and a node module in the first array adjacent in the second direction, the packet having a first node address in the first direction and a second node address in the second direction; and
a second storage unit including a second processor and a second array of node modules forming a grid arrangement in a third direction and a fourth direction that intersects the third direction, each node module including a memory chip and a node controller, the node controller being configured to transfer a packet including data to and from a node module in the second array adjacent in the third direction and a node module in the second array adjacent in the fourth direction, wherein
the first processor is configured to control the first and second storage units, and
the second processor is configured to:
determine whether or not the first processor is set to control the second storage unit, using i) a first inquiry signal transmitted from the second processor to the first processor through a first communication path that includes the first and second arrays of node modules; and ii) a response to a second inquiry signal transmitted from the second processor to the first processor through a second communication path that does not include the first and second arrays of node modules, control the second storage unit and not the first storage unit, when the first processor is set to control the first and second storage units, and control the first and second storage units, when the first processor is set to not control the second storage unit.

2. The storage system according to claim 1, wherein the second processor determines whether or not the first processor is set to control the second storage unit, based on whether or not the first processor returns a response signal in response to the first inquiry signal.

3. The storage system according to claim 1, wherein the first inquiry signal is periodically transmitted from the second processor to the first processor.

4. The storage system according to claim 1, wherein when the storage system begins operating in a state in which the second processor is set to control the first and second storage units, the first processor transmits priority data to the second processor, and the second processor changes a setting thereof so as not to control the first processor, if a priority set for the second storage unit is of a lower priority than that indicated by the priority data received from the first processor.

5. The storage system according to claim 1, wherein when the storage system is operating in a state in which the second processor is set to control the first and second storage units and the first processor is restored to an operating state, the first processor transmits priority data to the second processor, and the second processor transmits to the first processor, a signal indicating that the second processor will control the first and second storage units, in response to the priority data received from the first processor.

6. The storage system according to claim 1, wherein at least one of the first and second storage units includes a memory region storing a record of communications performed when the first processor controls the second storage unit and communications performed when the second processor controls the first storage unit.

7. The storage system according to claim 1, further comprising:

a switch between the first processor and the second processor, that stores a record of communications performed when the first processor controls the second storage unit and communications performed when the second processor controls the first storage unit.

8. A method for controlling a storage system that has a first storage unit including a first processor and a first array of node modules, each including a memory unit; and a second storage unit including a second processor and a second array of node modules, each including a memory unit, the method comprising:

transmitting a first inquiry signal from the second processor to the first processor through a first communication path that includes the first and second arrays of node modules;

determining, by the second processor, whether or not the first processor is set to control the second storage unit based on a response to the first inquiry signal;

transmitting a second inquiry signal from the second processor to the first processor through a second communication path that does not include the first and second arrays of node modules;

determining, by the second processor, whether or not the first processor is set to control the second storage unit based also on a response to the second inquiry signal;

controlling the second storage unit and not the first storage unit, by the second processor, when the first processor is set to control the first and second storage units; and controlling the first and second storage units, by the second processor, when the first processor is set to not control the second storage unit.

9. The method according to claim 8, wherein the second processor determines whether or not the first processor is set to control the second storage unit, based on whether or not the first processor returns the response.

10. The method according to claim 8, wherein the first inquiry signal is periodically transmitted from the second processor to the first processor.

11. The method according to claim 8, further comprising:

transmitting priority data from the first processor to the second processor, when the storage system begins operating in a state in which the second processor is set to control the first and second storage units; and changing a setting of the second processor so that the second processor does not control the first processor, if a priority set for the second storage unit is of a lower priority than that indicated by the priority data received from the first processor.

12. The method according to claim 8, further comprising:

transmitting priority data from the first processor to the second processor, when the storage system is operating in a state in which the second processor is set to control the first and second storage units and the first processor is restored to an operating state; and transmitting from the second processor to the first processor, a signal indicating that the second processor will control the first and second storage units, in response to the priority data.

* * * * *